US012070669B2

(12) United States Patent
Mallory

(10) Patent No.: US 12,070,669 B2
(45) Date of Patent: Aug. 27, 2024

(54) GOLF SWING IMPROVEMENT AID

(71) Applicant: Eugene Mallory, Bowie, MD (US)

(72) Inventor: Eugene Mallory, Bowie, MD (US)

( * ) Notice: Subject to any disclaimer, the term of this patent is extended or adjusted under 35 U.S.C. 154(b) by 765 days.

(21) Appl. No.: 16/869,196

(22) Filed: May 7, 2020

(65) Prior Publication Data

US 2020/0269117 A1    Aug. 27, 2020

(51) Int. Cl.
*A63B 69/36* (2006.01)
*A63B 24/00* (2006.01)
*G09B 19/00* (2006.01)

(52) U.S. Cl.
CPC .......... *A63B 69/36* (2013.01); *A63B 24/0021* (2013.01); *G09B 19/0038* (2013.01);
(Continued)

(58) Field of Classification Search
CPC ............................ A63B 69/36; A63B 24/0021
See application file for complete search history.

(56) References Cited

U.S. PATENT DOCUMENTS

| | | | | |
|---|---|---|---|---|
| 3,727,069 A | * | 4/1973 | Crittenden, Jr. ........ | G01P 3/685 |
| | | | | 250/208.3 |
| 4,563,005 A | * | 1/1986 | Hand ..................... | A63B 63/00 |
| | | | | 434/247 |

(Continued)

*Primary Examiner* — Eugene L Kim
*Assistant Examiner* — Christopher Glenn

(57) ABSTRACT

An apparatus, methods and systems are provided for creating a shot information database comprising ball flight data combined with a user's intended golf shot type, the user's golf club selection, the user's setup position and dynamic swing adjustment made to produce the golfer's intended golf shot with the selected golf club to produce said golf shot. This invention presents to the user such information as a "score," wherein said score reflects the accuracy of the user's golf shot. In addition, the ball flight data includes a trajectory angle, an elevation angle, a quadrant in a "target plane" comprising an x-y coordinate system coplanar with said target plane and a characterization of a type of golf shot produced by said golfer, such as a "draw." Another embodiment of this invention performs a statistical analysis on said shot information to create basic and advance shot reports to assist a golfer or a third party to learn a golfer's strengths and weaknesses with respect to the user's ability to hit certain golf shots with certain golf clubs; in addition, the golfer is able to learn with setup "keys" and swing "keys" are more successful in hitting certain golf shots with certain golf clubs. In this manner a golfer or user is able to learn what it takes to improve his/her golf swing while better understanding their particular capabilities and tendencies. Another embodiment of this invention allows a golfer to practice indoors in a manner that simulates outdoor practice at a driving range, For golfer's who are visually impaired, this invention provides accurate feedback to a golfer who is visually impaired to the extent that they cannot see the flight of the struck golf ball. Said golfer benefits little at a driving range where they are unable to see the results of their golf swings This apparatus characterizes each golf shot using a particular practice ball which interoperates with the apparatus in such a way to enable said apparatus to acquire said ball flight data. Another embodiment of this invention allows a golfer to enter or speak remarks on the results of the previous shots or, more simply called post shot remarks. All shot information is stored in permanent storage for later historical performance analysis.

3 Claims, 17 Drawing Sheets

(52) U.S. Cl.
CPC ............... *A63B 2024/0031* (2013.01); *A63B 2024/0034* (2013.01); *A63B 2024/0056* (2013.01)

(56) References Cited

U.S. PATENT DOCUMENTS

| | | | | |
|---|---|---|---|---|
| 4,770,527 A * | 9/1988 | Park | ..................... | G01P 3/685 73/12.05 |
| 4,949,972 A * | 8/1990 | Goodwin | .................. | F41J 5/02 273/408 |
| 5,024,441 A * | 6/1991 | Rousseau | .......... | A63B 24/0021 473/155 |
| 5,230,505 A * | 7/1993 | Paquet | .............. | A63B 69/0002 250/222.2 |
| 5,577,733 A * | 11/1996 | Downing | ................... | F41J 1/10 250/222.2 |
| 5,626,526 A * | 5/1997 | Pao | ................... | A63B 24/0021 473/198 |
| 5,833,549 A * | 11/1998 | Zur | ................... | A63B 69/0002 463/36 |
| 6,135,456 A * | 10/2000 | Cooper | ............. | A63B 71/0622 434/11 |
| 7,399,241 B1 * | 7/2008 | Thomas, Sr. | ...... | A63B 69/0002 473/422 |
| 2002/0022530 A1 * | 2/2002 | Yoon | ................ | A63B 69/36211 473/150 |
| 2005/0137035 A1 * | 6/2005 | Huang | .............. | A63B 69/0002 473/454 |
| 2012/0016599 A1 * | 1/2012 | Ishii | ...................... | A63B 71/02 702/33 |
| 2012/0258432 A1 * | 10/2012 | Weissler | ..................... | F41J 5/10 434/20 |
| 2014/0118720 A1 * | 5/2014 | Steffl | ..................... | G01B 11/14 356/28 |
| 2014/0134586 A1 * | 5/2014 | Stein | ..................... | A61B 34/20 434/262 |
| 2016/0271446 A1 * | 9/2016 | Coleman | ................ | A63B 69/36 |
| 2016/0271477 A1 * | 9/2016 | Mann | ................ | A63B 69/3676 |
| 2019/0091535 A1 * | 3/2019 | DeCarlo | ............. | A63B 69/002 |

\* cited by examiner

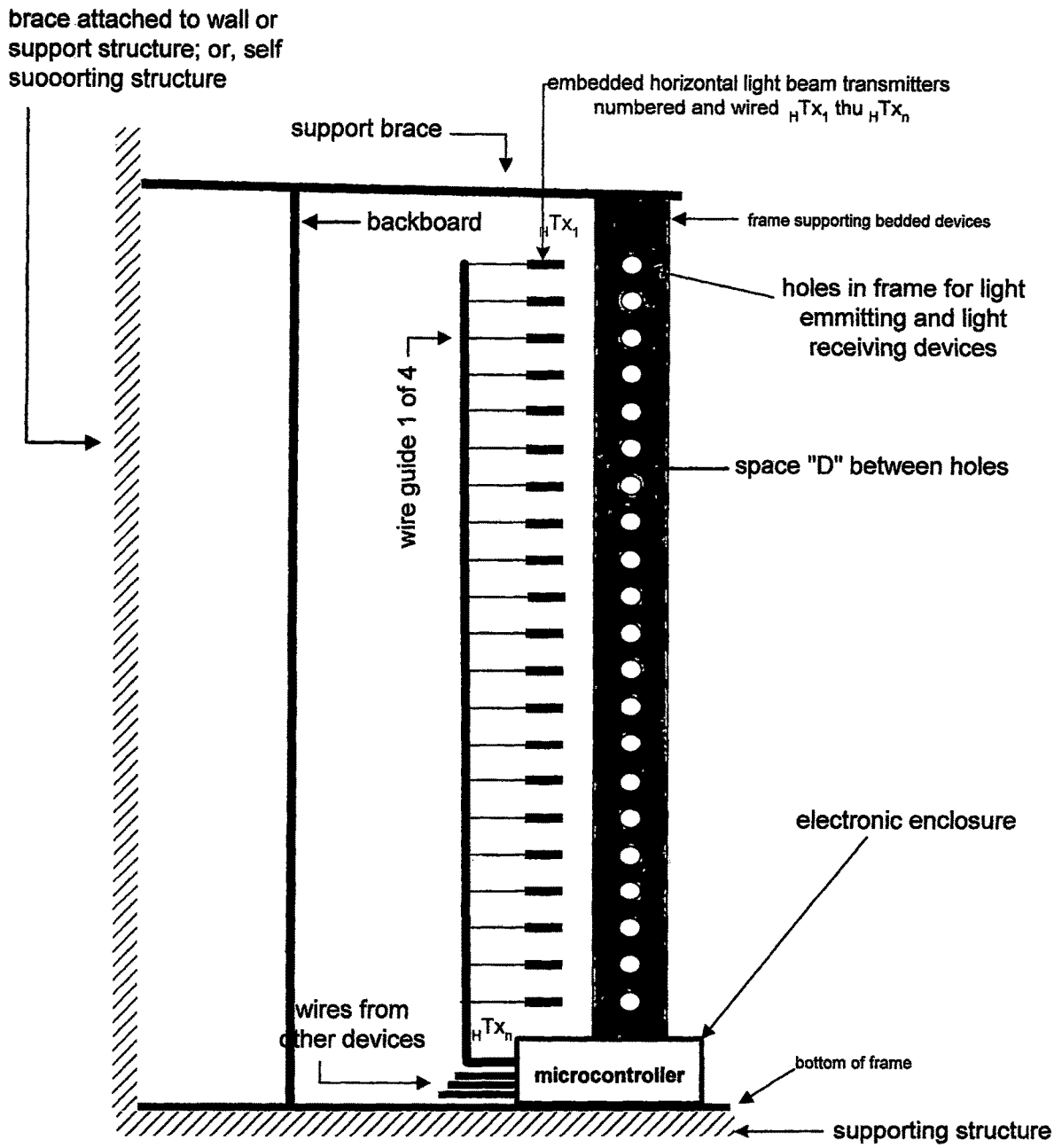
Figure 1A: Side view, apparatus

Ball Flight Table

| Ball Flights<br>Initial - ¹Bounce | Ball Spin<br>(Horiz. or Vert.) | Rebound<br>$z = \|a\| - \|b\|$ | Golf Shot |
|---|---|---|---|
| Straight - same | "none" | $z = 0$ | Straight shot |
| Left - same | "none" | $z = 0$ | Pull |
| Right - same | "none" | $z = 0$ | Push |
| Straight - left | Counter-clockwise | $z < 0$ | Slice |
| Right - right | Clockwise | $z > 0$ | Draw |
| Right - left | Counter-lockwise | $z > 0$ | Push slice |
| Straight - right | Clockwise | $z < 0$ | Hook |
| Left - left | Counter-clockwise | $z < 0$ | Fade |
| Left - right | Clockwise | $z > 0$ | Pull hook |

Fig. 9

User Sign-in Page

Sign in

Password (optional)

Home Screen

Basic Shots

Settings

Basic Reports

Advanced Reports

Fig. 12

← Main Menu

Settings Page (1)

Distance to Target area: "10" feet

Target Center: ↑ 0   0 ↓   → 0   0 ←   X 2.5 inches ( Next )   ( Done )

---

Club used "6 iron"      Golf shot attempted "straight"      Page (*)

| Static Swing Setup Page (2) | Dynamic Swing Adjustments Page (3) |
|---|---|
| ( Edit ) | ( Edit ) |

*** ──────↓

| | | | | |
|---|---|---|---|---|
| ⦿ grip | weak-N-strong | | ⦿ take-a-way | outside-S-inside |
| ⦿ club face | open-S-closed | | ⦿ swing speed | half-3/4-full _____ |
| ☐ posture | bent-N-upright | | ☐ neck:SH turn | ccw-N-cwt |
| ☐ aim | left-S-right | | ☐ L-knee pointing | left-S-right |
| ☐ stance | open-S-closed | | ☐ left arm | straight-M-bent |
| ☐ hands | low-N-high | | ☐ wrist cock | open-S-closed |
| ☐ ball pos. (a-c) | away-N-close | | ☐ swing parh | outside-S-inside |
| ☐ ball pos. (f-b) | forward-M-back | | ☐ club release | early-M-late |
| ☐ knee bend | more-M-less | | ☐ right knee | early-B-late |
| ☐ shaft angle | front(+)-B-behind(-) | | ☐ weight shift | inside RF----outside LF |
| ☐ head position | up-M-down | | ☐ swing plane | upright-M-flat |
| ☐ elbows | tight-M-loose | | ☐ left heel (BW) | down-roll-up |
| ⦿ weight (t-h) | toe-M-heel | | ☐ breathing | in- Hold-out |
| ☐ weight (l-r) | left-M-right | | ☐ eyes on ball | inside-M-outside |
| ☐ thigh pres | inside-R-left leg | | | |

( Restore )    ( Next )        ( Restore )    ( Done )

Legend (global)

N = neutral    M = middle
S = square     B = bottom
P = pressure   Center x 2.5 inches
R = right leg  SH = sholder
P (*) = appears in Page 2 and 3.

* Adjustment Slider**
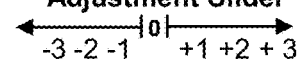
-3 -2 -1   +1 +2 +3

Fig. 13

← Main Menu     Basic Reports

Page One

Selection Criteria ("filters")

- ▣   Date range ___/___ or Last ___ shots
- [1] ▣   select club(s) "6 iron," "irons" or "woods"
- [2] ▣   select shot attempted "draw" or "all"
- ☐ ▣   shot results "fade" or "all"
- ☐ ▣   scores above "75" or "all"
- ☐ ☐   average score _____

( Cancel )  ( Run )

Page Two

Report Output Listed in Sort Order
Date range ___/___ or Last ___ shots

- ☐ ▣   club(s) used
- [2] ▣   shot attempted
- [3] ▣   percent success
- ▣   average score
- ▣   percent above 75 score
- ▣   percents & averages:

*pct(Q):* *L____ *R_____ Str____
    *avg(T):* *L____ *R_____ Str____
    *avg(E):* *L____ *R_____ Str____

- ▣   total shots _____

( Back )  ( Print )

( Done )

Notes

1. In column one, the squares with the dots indicate that this a mandatory selection, except if there is a empty square next to it.
2. In column two, an empty box next to a box with a dot, indicated that certain fields are mutually exclusive depending on the selection or no selection in column one.
3. The order of selecting report criteria determins to sort order of the report output.

Fig. 15

← Main Menu

Create Advanced Reports

☉ Date range ___/___ or Last ___ shots

Shot Information Fields

☐ 1. selected club
☐ 2. shot attempted _____
☐ ☉ 3. shot results _____
☐ 4. score
☐ 5. quadrant
☐ 6. elevation
☐ 7. trajectory

Static Setup Fields

② ☉ 8. grip _____
☐ 9. club face
☐ 10. posture
☐ 11. aim "right"
☐ 12. stance
☐ 13. hands
☐ 14. ball pos. (a-c)
☐ 15. ball pos. (f-b)
☐ 16. knee bend
☐ 17. shaft angle
☐ 18. head pos. (u-d)
☐ 19. elbows
☐ 20. weight
☐ 21. weight
☐ 22. thigh pressure

Dynamic Swing Fields

☐ 23. take-a-way _____
☐ ☉ 24. swing speed
☐ 25. neck movement
☐ 26. left knee
☐ 27. left arm
☐ ☉ 28. wrist cock
☐ 29. swing parh
☐ 30. hands release
☐ 31. right knee
☐ 32. weight shift
☐ 33. swing plane

Advanced Report

User _____ Date _____ sort field (SF) #1, SF#2, ..... SF#n ( Run )   ( Print )

Notes:
1. A report field (criteria) is selected by selecting the box ajacent to the report field.
2. A number appears in a box ajacent to the field selected in accordance with the order in which the field was selected.
3. The report is displayed or printed out in sort order

Fig. 16

GOLF SWING IMPROVEMENT AID

BACKGROUND OF INVENTION

This invention relates to the field of golf swing improvement through golf shot performance analysis. This field is generally focused on a struck golf ball's flight statistics. As the technology matured and was adapted for indoor use, it loss the visual feedback of an actual golf ball's flight patterns which reinforce a golfer's comprehension of ball flight statistics. To overcome this shortcoming, programmers developed flight patterns out of ball flight statistics and projected those patterns onto a display screen. Even though the accuracy of the depicted ball flight patterns depicted on the screen may not be questioned by the golfer, the loss of the visual feedback of the actual golf ball's flight pattern diminishes the actual value of this type of practice session. In addition, due to the complexity of the golf swing, involving numerous setup positions and swing adjustments each dependent on the golf club to be used and the type of golf shot to be executed, the actual value of the ball flight statistics when not correlated with the golfer's intentions and physical actions, the ball flight statistics become even less meaningful. There is a need, therefore, for a system and methods that allow a golfer to correlate the golfer's intention to hit a certain golf shot with a certain golf club and the golfer's physical setup and swing adjustment to execute the intended shot, with the actual golf shot and ball flight statistics produced by the golfer's intentions and physical actions. There is equally a need to compile said correlated data into a shot information database upon which statistical analysis can be performed. It is a generally accepted paradigm that golf swing improvement requires practice and that a golfer's swing improvements can be generally tied to the amount of practice a golfer achieves. While the aforementioned technology adapted for indoor use affords a golfer conceptually more time to practice, there exist the problem of safety considering a golf ball or similar hard objects are dangerous to persons and objects when used indoors. There exists, combined with the needs previously identified, a further need to provide a system and methods that allow golfers to practice safely at home in an efficient and productive manner.

BRIEF SUMMARY OF THE INVENTION

This invention utilizes a novel, non-obvious approach to improving a user's golf swing by correlating the intentions and the physical actions of a golfer or user with the ball flight statistics produced by the golfer's effort to hit a certain type golf shot with a certain type golf club. In order to describe what a golfer does to hit particular golf shots with a given golf club, requires an in depth analysis of a plurality of setup "keys" and a plurality of swing "keys," defined herein as a set of physical parameters which can be described and understood by those who are skilled in the game of golf terminology. A skilled golfer knows the "keys" to hitting certain golf shots with certain golf clubs. Golfer's desiring to improve their golf swings must acquire critical knowledge about how to set up for a desired golf shot and how to execute said golf shot with a particular golf club. The enormous number of possible combinations of "setup keys" and "swing keys" makes golf one of the most difficult games to learn. Moreover, a system and method to aid a golfer's task of identifying and remembering each setup and swing key combination among the enormous number of combinations, is lacking in the prior art. Thus, there remains a need for systems and methods that provide for an improved, more detailed golf swing analysis. A preferred embodiment of this invention comprises a golf shot information database on which to apply statistical analysis of a golfer's golf shot performance, wherein said database includes such swing key parameters as a grip type, namely, "weak," "neutral" or "strong" among a plurality of other setup keys; and includes such swing keys as a take-a-way type, namely, "outside," "square" or "inside" among a plurality of other swing keys Although the various "keys" or parameters are named, this is not to be understood as a limitation. Users or third parties can name their own keys and key modifiers. Another embodiment of this invention is a multi-user system wherein the database comprising a multitude of keys for a multitude of users, wherein each user's golf shot performance data is stored in permanent storage in a shot information database and available for historical searches and statistical analysis.

Another embodiment of this invention solves the aforementioned problems by enabling golfers or users, to safely practice indoors using a simulation ball characterized by a certain degree of "softness" when compared to a golf ball or similar hard balls, and a certain degree of "lightness" when compared to the weight of a golf ball or similar hard balls, allowing users to practice in a manner similar to the way golfers would practice outdoors at a driving range. This invention provides to golfers for each of their golf shots, a visual ball flight pattern, a plurality of ball flight statistics and other data including, a type of golf club used to hit the intended golf shot, the type of golf shot the golfer intends to hit, the golfer's static setup positions used to hit said golf shot and the golfer's dynamic swing adjustments starting from the backswing and ending with the follow-through. A golfer's static setup positions are referred herein as "setup keys" and a golfer's dynamic swing adjustments are referred to herein as "swing keys." Said ball flight statistics comprising: a ball launch elevation angle, a ball trajectory angle, a quadrant, a score relating to the accuracy of said golf shot, and a characterization of said golf shot into one of a plurality of types of golf shots, for example, a "draw" or a "fade." A combination of ball flight statistics with said other data, is herein referred to as Shot Information. Said other data is herein referred to as Pre-Shot Data. Said Shot Information is electronically captured and stored for immediate observation by the user or for later statistical analysis by the user, third party, device, or system. Another embodiment of this invention is that it provides users with a self-help method, whereby the golfer can set up to hit a particular type golf shot, for example a "draw" with a particular type golf club, for example, a "6 iron" and visually observe the ball's flight path, evaluate the Shot Information data and, if desired, make changes to the golfer's setup keys and/or swing keys and then hit another golf shot and perform a comparative analysis with the previous golf shot. By this approach to golf swing self-improvement, a golfer is able to practice at home in a manner equal to or superior to practicing at a driving range in that the golfer's Shot Information is stored in a database for later statistical analysis. An added benefit is the reduction in the time and expense of traveling to and from a driving range thereby providing golfers with an opportunity to practice more frequently, less costly and more productively at home or elsewhere. Also, the Shot Information and a statistical analysis of said Shot Information provided by this invention allows golfers to learn the strengths and weaknesses of their golf swings and to learn the optimum setup keys and swing keys to hit certain shots and thereby become their own coaches. Another aspect of this invention is that it addresses a main reason why golf is so difficult to learn, and that is because there are a vast number of different combinations of possible ways to hit a specific golf shot with a specific golf club. Although this embodiment considers a plurality of different setup positions and plurality of dynamic swing adjustments, the user is able to customize "key" parameters and their elements. The number of possible combinations thereof is enormous. The probability of hitting a perfect golf shot given the vast number of possible combinations is extremely small. This invention stores and characterizes each golf shot into one of at least nine types of golf shots for immediate analysis, or for later group analysis. In a process of data reduction, namely, removing or fixing "keys" under consideration among the plurality of different setup keys and/or swing keys, golfers are able to determine which "keys" under consideration are more influential factors in hitting a desired golf shot. By removing non-relevant "keys" and fixing others like a certain type of "grip," golfers are able to reduce the complexity in learning the golf swing. This invention provides for operation over local networks however, it is within the scope of this invention to one skilled in the art to provide for local and/or remote processing of shot information and interoperation with one or more devices on the local network to provide such services as a database server, a speech-to-text server and adaptations to third party services or devices. This invention is a major step forward in the field of golf swing improvement through the statistical analysis of compiled Shot Information. These and other aspects of the preferred embodiment of the invention will become apparent to those skilled in the art when considered along with the drawings and the descriptions which support the claimed invention.

BRIEF DESCRIPTION OF THE SEVERAL VIEWS OF THE DRAWINGS

FIG. 1A provides more detail on the frame comprising a plurality of holes, a plurality of optoelectronic devices, a wiring plan, an electronic enclosure and structural supports.

FIGS. 3-8 show the various geometric constructions and projections underlying and supporting the various algorithms and calculation for Trajectory Angle, Launch or Elevation Angle, Spin Direction and Golf Shot Determination.

FIG. 9 shows a Ball Flight Table constructed to illustrate the elements used to characterize a golf shot. In this illustration, a Ball Flight column describes an Initial trajectory and a Bounce trajectory; a Ball Spin column describes a horizontal direction of spin, herein defined as clockwise, counter-clockwise or zero spin direction, in either a clockwise or a counter-clockwise direction, A Rebound column shows the formula used to calculate the direction of spin, or no spin. A Golf Shot column identifies the various types of golf shots that be described by the parameters in the foregoing columns, wherein the Bounce direction correlates to opposite direction a golf ball curves in free space once the horizontal component of ball spin start to dominate changes in ball flight direction. A golf ball's spin direction having an effect on a golf ball's final flight trajectory is well known to those skilled in golf. The phenomenon of a ball's spin direction having an effect on a ball's bounce or rebound direction, based on a spin direction and its magnitude, is well known to those skilled in the trade.

FIG. 12, Application Main Menu, shows at least one computer application configured to guide a user through the use of the invention. Before the Main Menu selections are available to a user, the user must sign in with a username in order to activate a multi-user application; a password is optional. The owner of the system is assigned an administrator's username called "admin" and a password called "password." The administrator's password can be changed by the administrator. Each user is assigned a separate location in memory where all the users' files are stored. Common files are assessable to all users. Administrator's files and commands are only assessable to the Administrator or owner. A FIG. 13—User Settings: The "Settings" icon when selected takes the user to a "Settings" page shown in FIG. 13. This is where the user can edit the fields listed on the Settings pages.

Figure 1:
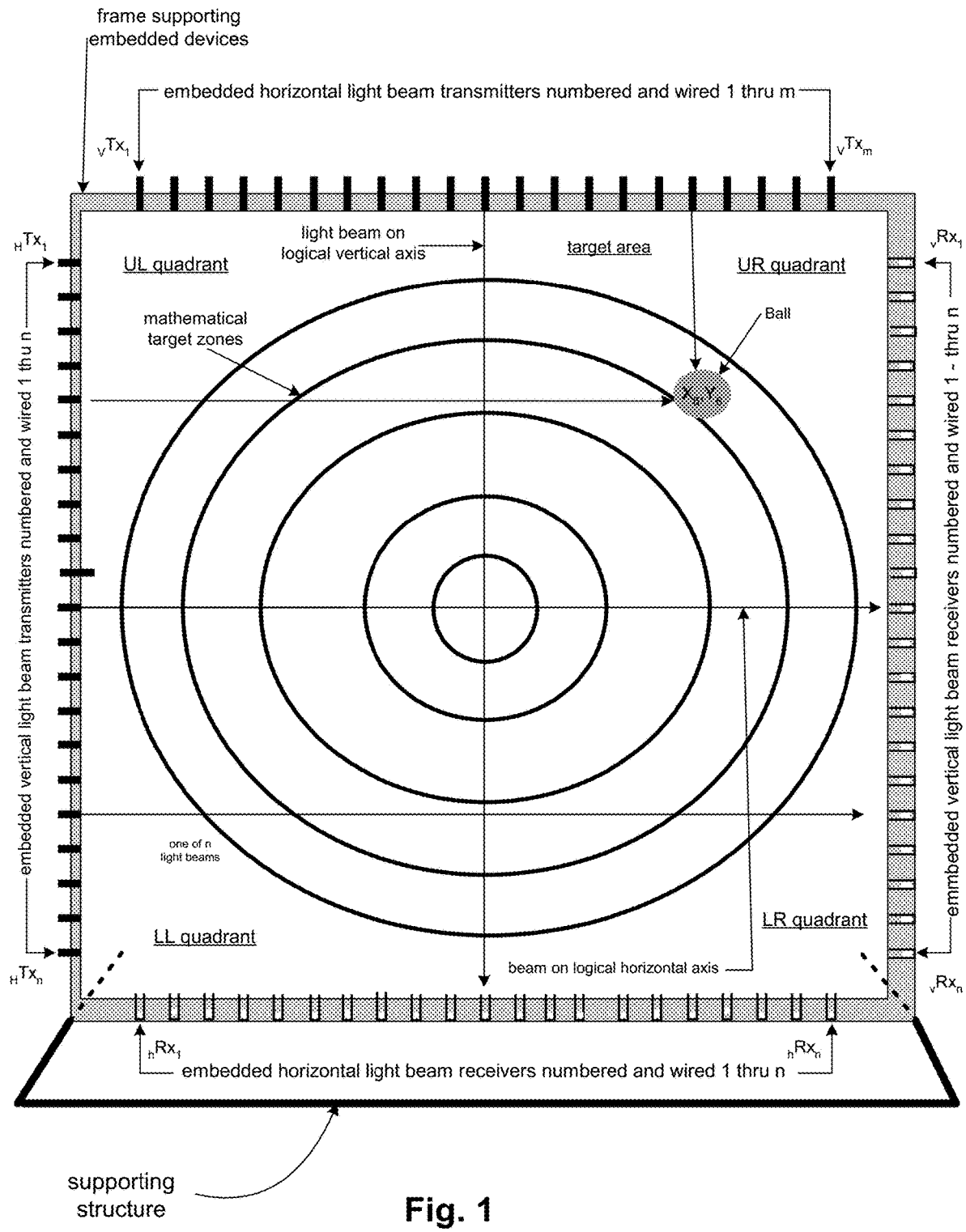
FIG. 1 is drawing depicting an overall view of an apparatus which is part of a system for a Golf Swing Improvement Aid. Said apparatus comprising an outer structure which encloses an inner structure, wherein said inner structure comprising a frame, wherein said frame encloses an empty space. Said frame can be mounted in the structure or be an integral part of the structure. Said structure can be braced for stability, or it can be self-supporting. Said frame encloses an empty space. Said empty space comprises a Target Area enclosed by a perimeter of said frame. Said frame encompasses an open front space and an open rear space so as to provide access to said Target Area from the front and from the rear. Said apparatus comprises a backboard, or a wall in close proximity to the structure and either one serving as a functional rebound surface.

When selected, the shot modes tell the microcontroller to wake up and prepare the sensors to detect balls crossing the Target plane, as described under Microcontroller. After each golf shot is handled by the microcontroller, it sends Shot Data to the application and waits, a period of time, for either additional golf shots or, addition instruction from the application. A red light on the apparatus appears after a period of inactivity and tells the user that the apparatus is not ready to receive shots. When the microcontroller is ready to accept golf shots, a green light is shown on the apparatus. After a period of inactivity, the microcontroller sets all the sensors to an idle mode thereby conserving power and extending the life of the sensors.

FIG. 15—Basic Reports: When the "Create Reports" icon is selected in the "Main" menu page, the application takes the user to a "Basic Reports" page. This page is created in temporary storage. The user is allowed to create a basic report by selecting a box adjacent to the listed items in column one. The sort order of the report created is controlled by the order in which the user selects the items to be in the report.

FIG. 16—Advanced Reports: When the "Advanced report" icon is selected, the application takes the user to a page where the user can create a more comprehensive report than the Basic report. The user can select report fields an establish criteria for inclusion in the report.

DETAILED DESCRIPTION OF THE INVENTION

The following description of this invention includes the use of descriptive drawings, algorithms, methods and systems to convey to one skilled in the art, the manner in which to make this invention. This description includes terms like "static setup positions" and "dynamic swing adjustments." In order to convey well-known concepts to those skilled in golf, at times, these terms are shortened to "Setup" or "Swing" to inform those skilled in golf jargon of the specific ideas under consideration; namely, a set of "Setup" positions such as an "open stance" or a "weak grip;" and a set of "Swing" moves a golfer executes after the setup is completed, including moves such as a "waggle," a "take-a-way," a "Backswing," a "wrist-cock" and finishing with a follow-through; wherein the particular setup and swing are dependent, in part, on the type of golf shot the golfer intends to hit with a particular golf club. There are a plurality of "parameters" comprising a set of setup positions and a set of swing adjustments. These parameters are identified by name. For example, the set of Setup parameters include, a "grip" and a "stance" and the set of Swing parameters include, a "waggle" and a "take-a-way." Each parameter has "elements" that modify the parameter. For example, the grip parameter has 3 elements, namely, "weak," "neutral" or "strong." Likewise, the "take-a-way" parameter has 3 elements, namely, "outside," "square" and "inside." Each of said elements comprising at least one setup "choice" or one swing "adjustment." Each element can be modified by the user based, in part, on the user's desire hit a certain type of golf shot with a particular type golf club. It should be noted that although a plurality of parameters and their elements are identified by name, that the names herein used to describe said parameters and their elements are not to be consider a limitation on either the quantity and/or names of said parameters; nor a limitation of the quantity and names of said elements and/or their modifiers. The drawings, algorithm, methods and systems are provided for the purpose of describing a preferred embodiment of the invention and are not intended to limit the invention thereto.

This invention for a Golf Swing Improvement Aid, provides a system including, an apparatus including at least one microcontroller and at least one computing device such as a mobile computing device, a laptop, a desktop, and a tablet for receiving shot data from the microcontroller. Said shot data comprising all golf shot types known to those skilled in the game of golf. Said system described in detail below, comprising an application installed on a microcontroller, a program memory, a random access memory (RAM), a wired and a wireless communications component and a client-server component. The at least one mobile computing device comprising a program memory to store computer applications, a wireless networking component, a client-server component, a database component, a random access memory (RAM) component, a graphical user interface (GUI) and a permanent storage component. The preferred embodiment of this invention comprises hardware and software in combination to create shot data by analyzing a ball's actual flight pattern and equating said flight pattern to one of at least nine types of golf shots. Said shot data metrics include, an elevation angle, a trajectory angle, accuracy metric defined as a score and a golf shot characterization by using the user's ball flight data to equate the user's executed golf shot to one of the known types of golf shots. Each user's ball flight data is associated with the user's "pre-shot data" comprising the golf shot the golfer intended to execute with a particular golf club, the Setup parameters and the Swing parameters. Said pre-shot data is appended to the ball flight data to form a Shot Information record.

In this embodiment the mobile computing device is configured to compile a user's pre-shot data by requiring the user to input, prior to executing a golf shot, the type of club the user will use to execute the golf shot and the type of golf shot the golfer intends to execute. The golfer has additional options prior to executing the next golf shot including, modifying elements of Setup and Swing parameters. Said "shot information," wherein said shot information is used to compute a "success" or a "failure" in terms of resolving the golfer's intended golf shot versus the golf shot the golfer actually executed. Said computer application installed on at least one computing device is configured to use said Shot Information to perform a statistical analysis on at least one of the golfer's golf shots. In the "records" to uncover or reveal important aspects of the golfer's swing "profile," wherein an understanding a golfer's strengths and weaknesses, shot selection results, club selection results, setup problems and swing move problems, is critical to a golfer's understanding how to improve his/he golf swing. This invention provides a new and novel approach to improving a golfer's golf swing. Another novel feature of this invention is that it is immensely useful for visually impaired golfers who cannot fully benefit from practicing at a driving range. Another embodiment of this invention is that it enables a plurality of users to create a separate profile comprising their own Settings and Shot Information file by enabling separate user logins for a multi-user system. In consideration of the enormous amount of setup and swing adjustments combinations involved in hitting consistent golf shot, this invention enables a golfer to focus on those elements of the golf swing which have the greatest impact on the result of a golf swing while reducing or eliminating elements of the golf swing which have little to no substantial impact of the result of a golf swing. In this manner, the enormous number of possible golf swing combinations, comprising shot selection, golf club, setup positions and dynamic swing moves, can be reduced to a manageable number of possible combinations. For example, if a golfer wants to hit a draw with a 6 iron, one of a number of possible choices for a grip choice is "strong" as opposed to "weak" or "neutral." By setting the grip parameter to "strong," that eliminates a number of possible setup parameters to consider. FIG. 13, "Settings," illustrates the static and dynamic parameters referred above. The following is a detailed description of the various parts of this invention including its embodiments.

FIG. 1 shows a frame supported by a structure of a predetermined size and shape depending on several factors including, the size and shape of the location where the apparatus will be used. Said structure and frame consists of a rigid material such that it can be mounted to another structure or, it can be self-supporting or free standing. The frame depicted in FIG. 1, consists of a left side, a right side, a top side, and a bottom side. Imbedded in the left side of the frame is a first group of light beam emitting devices, labeled $_HTx_1$ thru $_HTx_n$; said devices are hereinafter referred to as "transmitters." Imbedded in the top side of the frame is a second group of transmitters labeled $_VTx_1$ thru $_VTx_m$. Imbedded in the right side of the frame is a first group of light beam receivers; said devices are hereinafter referred to as "receivers" and labeled $_HRX_1$ thru $_HRX_n$. Embedded in the bottom side of the frame is a second group of receivers, labeled $_VRx_1$ thru $_VRx_m$. FIG. 1 also depicts a series of logical concentric circles used to represent a group of mathematical Target zones. The concept of a using a Target zone to calculate a score mathematically is more precise than estimating a score based on how close a projectile is to a scoring circle or Target zone. The mathematical algorithm based on a radius of a circle is used in the calculation of a score. The a field of intersecting light beams. These light beams do not interact with each other because there are no elemental photon-photon interactions. Said structure supports all equipment, including the frame, all wires and electronic components. To aid in computing, a Target zone is further divided into quadrants labeled clockwise UL, UR, LR, and LL. The mathematical center of the Target area is shown by two arrows, one from the left side of the frame and one from the top side of the frame. As shown, these two intersecting beams emanate from the middle of the left side transmitters, hereinafter referred to as "horizontal" transmitters, and from the middle of the top side transmitters, hereinafter referred to as "vertical" transmitters. A ball is shown traversing the UR quadrant of the Target zones and intersecting two light beams. A support structure is shown at the bottom of the frame. The apparatus is situated in front of the backboard, which may serve additional functions such as, Target area illumination, location in the Target area where the ball struck the backboard, a display area where a resulting golf shot characterization can be depicted on a screen incorporated into the backboard, and a display screen for communicating with the user by various means. Said frame depicted in FIG. 1, comprises a plurality of light emitting devices, and light receiving devices. The function of the light emitting device is to focus a beam of light onto a light receiving device which is physically and electrically paired on the opposite side of the frame. The function of the light receiving device is to react to the physical presence or absence of the light beam emanating from its paired transmitter by outputting a signal on its output lead. All transmitters and receivers are uniquely identified by a wiring nomenclature shown in FIG. 1.

The Target area forms a vertical plane parallel to a back plane and both are orthogonal to a Ground plane or floor. Within said plane a mathematical Cartesian coordinate system is formed with the x and y coordinates of said system provided by the subscripts of the horizontal and vertical receivers. The intersecting light beams from the horizontal and vertical transmitters form the Target plane. The intersecting horizontal and vertical light beams define a set of points in said x-y plane. Said x-y plane is electronically superimposed within said Target area.

Figure 2:
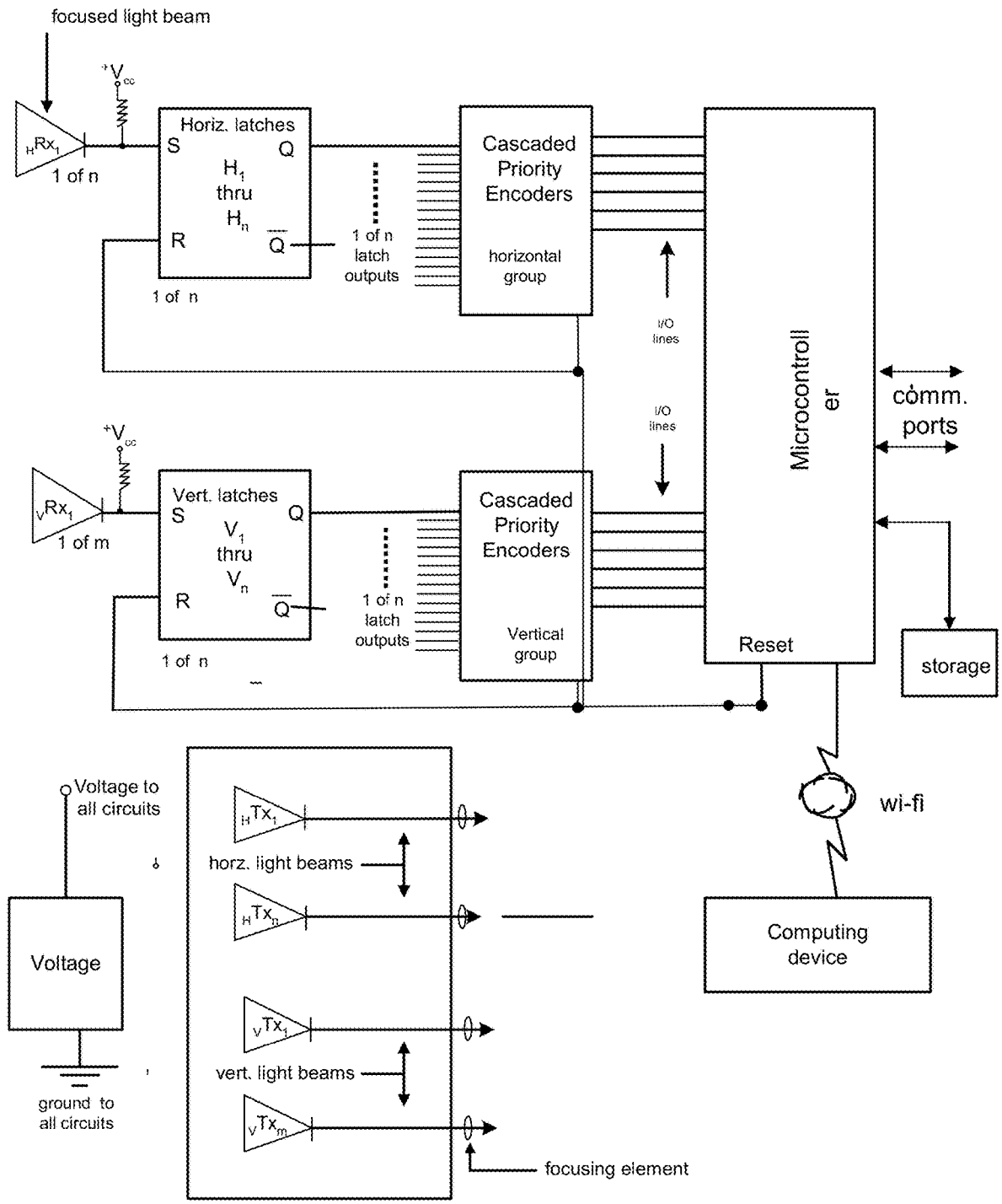

FIG. 1A FIG. 2 depicts the side view of the left side of the frame. It shows a multiplicity of holes. These holes are incorporated into the frame to house transmitter and receivers. These holes are spaced apart from each other a distance D, equal to less than the diameter of a specified ball and numbered consecutively from 1 to n. FIG. 2 shows a multiplicity of transmitters which, which for the purpose of clarity, are shown outside of the holes they are intended to be inserted into and fastened for support and stability. The transmitters are shown wired and channeled through a wire management system attached to the structure to facilitate wiring and management of all of the transmitters and receivers, and other parts of the system including, connectors, power, ground, and signal leads. At the bottom of the structure, a grounded electronic enclosure is shown which houses a multiplicity of components including, cable connectors, a power supply, and a microcontroller. The frame is supported, in part by a bottom supporting structure and a brace which could attach to a wall for wall support or, the structure could be free standing. The top side, the left side, and the bottom side of the frame are not shown in FIG. 2; however, all sides have the same basic structure as the left side shown in FIG. 2.

Figure 3:
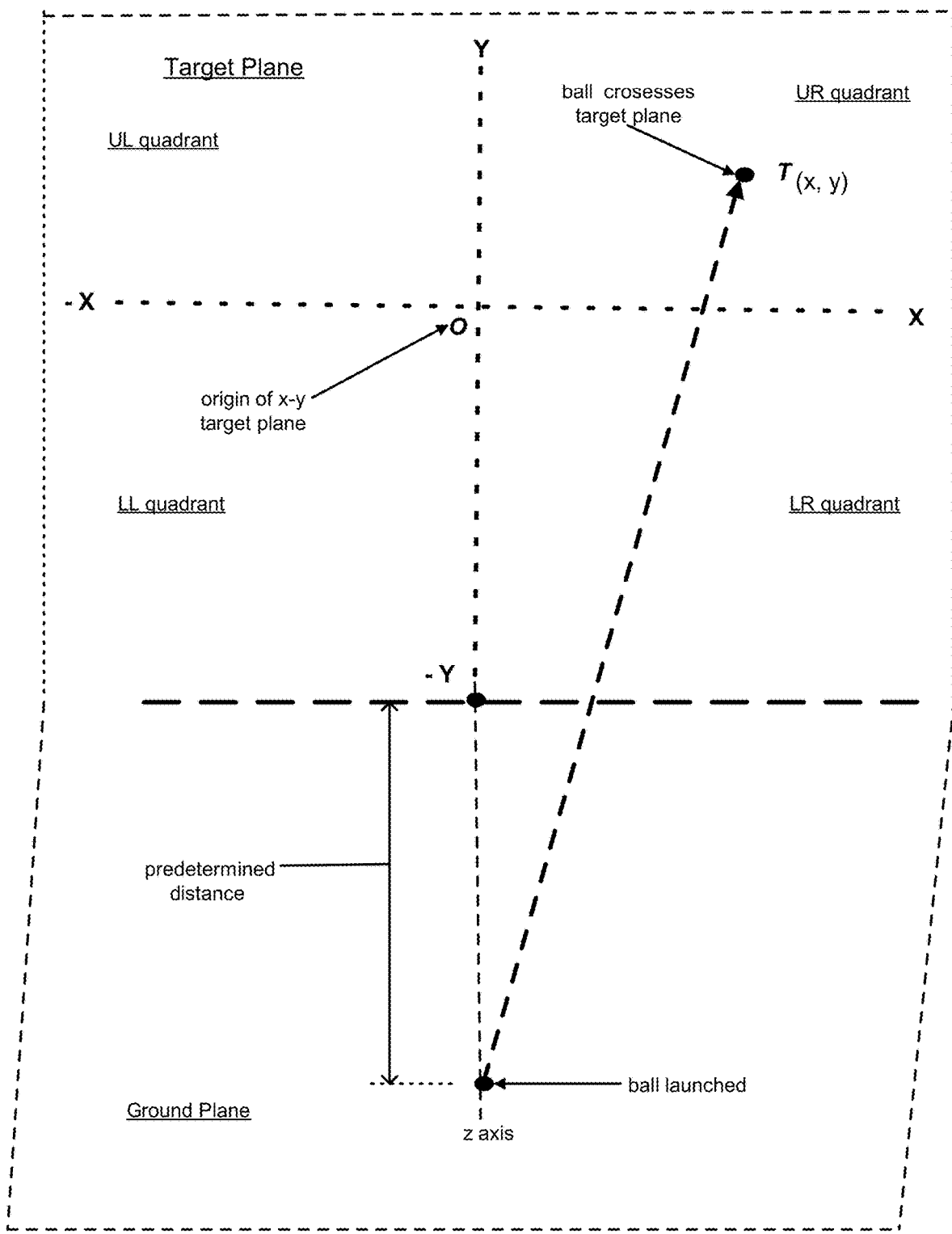
FIG. 3 shows a Functional Block Diagram depicting a variety of electrical components comprising, a multiplicity of wires, a power source; a multiplicity of transmitters and receivers; a multiplicity of horizontal and vertical latches, a multiplicity of horizontal and vertical cascaded priority encoders, a microcontroller comprising a plurality of input/output (I/O) ports, a wireless networking component, a storage device, and a computing device. The aforementioned electrical components are shown wired and connected in a functional signal flow manner. This embodiment utilizes the devices shown however the same results can be achieved in various other technologies, including IC, ASIC and large scale integration (LSI) and such as Field Programmable Gate Arrays (FPGA).

FIG. 3 depicts a variety of electrical components comprising, a multiplicity of wires, a power source; a multiplicity of transmitters and receivers; a multiplicity of horizontal and vertical latches, a multiplicity of horizontal and vertical cascaded priority encoders, a microcontroller comprising a plurality of input/output (I/O) ports, a wireless networking component, a storage device, and a computing device. The aforementioned electrical components are shown wired and connected in a functional signal flow manner. This embodiment utilizes the devices shown; however, the same results can be achieved using various other technologies, including IC, ASIC and large scale integration (LSI) and Field Programmable Gate Arrays (FPGA).

Wiring: The aforementioned electronic devices are situated one or more PC boards housed in the electronic enclosure and wired together as shown in FIG. 3 and referred to herein as a system. Please refer to FIGS. 1A and 23 for this discussion. The transmitters and receivers are inserted into the holes provided in the frame. A power source located in the electronic enclosure provides DC voltages and ground to all electronic circuitry located within the electronic enclosure and to all transmitters and receivers located in the frame. Signal, ground and power leads to the transmitters and receivers are connected by wires run through channels in the frame back to the electronic enclosure facilitated by a wire management system consisting of channels in the frame. A power supply of sufficient capacity is chosen to provide DC power to all devices, including a plurality of transmitters, a plurality of receivers, a plurality of latches, a plurality of cascaded priority encoders, and a microcontroller. DC power and ground are run from the electronic enclosure to a power bus and a ground bus which are run through channels in the frame to the transmitters and receivers. Each receiver has an output lead that changes state from low to high depending on whether the receiver detects light from its paired transmitter. Said output state leads are run through a first and second channel in the frame to the electronic enclosure where they are connected sequentially to input leads of said latches as follows: horizontal receivers labeled $_hR_1$ to $_hR_n$ in FIG. 1 are connected to horizontal latches numbered 1 to n (H1-Hn); and vertical receivers labeled $_VR_1$ to $_VR_m$ in FIG. 1 are connected to vertical latches labeled 1 to m (V1-Vm). Connecting a multitude of receiver signal leads, power, and ground leads to the enclosure is accomplished with miniature, high pin count connectors. These connectors connect to the PC board(s) within the enclosure which houses the triggers, latches, the encoders and the microcontroller.

Signal Flow: The horizontal and vertical receiver state leads outputs are inputs to trigger devices and from there, signals go to latches, wherein said signals are clocked and timed so as to provide a concurrent output on their signal leads. The concurrent outputs from the latches are connected to their respective horizontal and vertical cascaded priority encoders. Said horizontal and vertical cascaded priority encoders accept one timed input each in a given time period, or a number of clock cycles, from the horizontal and vertical latches. The horizontal and vertical cascaded priority encoders are wired together into two separate groups, one horizontal and one vertical, to perform the function of providing a binary coded decimal (BCD) output to the microcontroller based on the inputs they receive from the horizontal and vertical latches. These BCD outputs, initiated by at least one of the horizontal receivers and by at least one of the vertical receivers, are timed and passed to the microcontroller concurrently. The BCD outputs from each group of cascaded priority encoders range in numerical value from 1 to n for the horizontal receivers and from 1 to m from the vertical receivers. The digitally encoded base$_{10}$ horizontal and vertical outputs from the cascaded priority encoders are connected to a plurality of input/outputs (IO) leads on said microcontroller. Output leads from the horizontal cascaded priority encoders are connected to a first set of I/O leads on the microcontroller, and output leads from the vertical cascaded priority encoders are connected to a second set of I/O leads on the microcontroller. The Microcontroller clock, set and reset leads from the microcontroller control the latches and the encoders. The receivers and transmitters are not clocked. The receivers respond to the absence of light. The power to the transmitters and receivers is run through a digitally control switch so that the microcontroller can interrupt power to the transmitters, receivers and other parts of the system after an adjustable period of inactivity to conserve power and extend the life of the system.

FIG. 3 shows a practice ball being launched from point L, on the Ground plane, which is a predetermined perpendicular distance from the bottom of the Target plane and indicted by line LO', Point O' and point −Y are the same point, located where the target plane and the Ground planes intercept. The target plane and the Ground plane are orthogonal. A mathematical coordinate system is formed by logically dividing the target plane into four quadrants as shown and is represented by the letters UR, LR, LL, and UL. Point T(x,y) is shown in the UR quadrant. Point T (x,y) represents the point where the practice ball, when struck such that it crosses the x-y plane target plane and intercepts or momentarily blocks the light beans from striking at least one horizontal and one vertical receivers.

Figure 4:
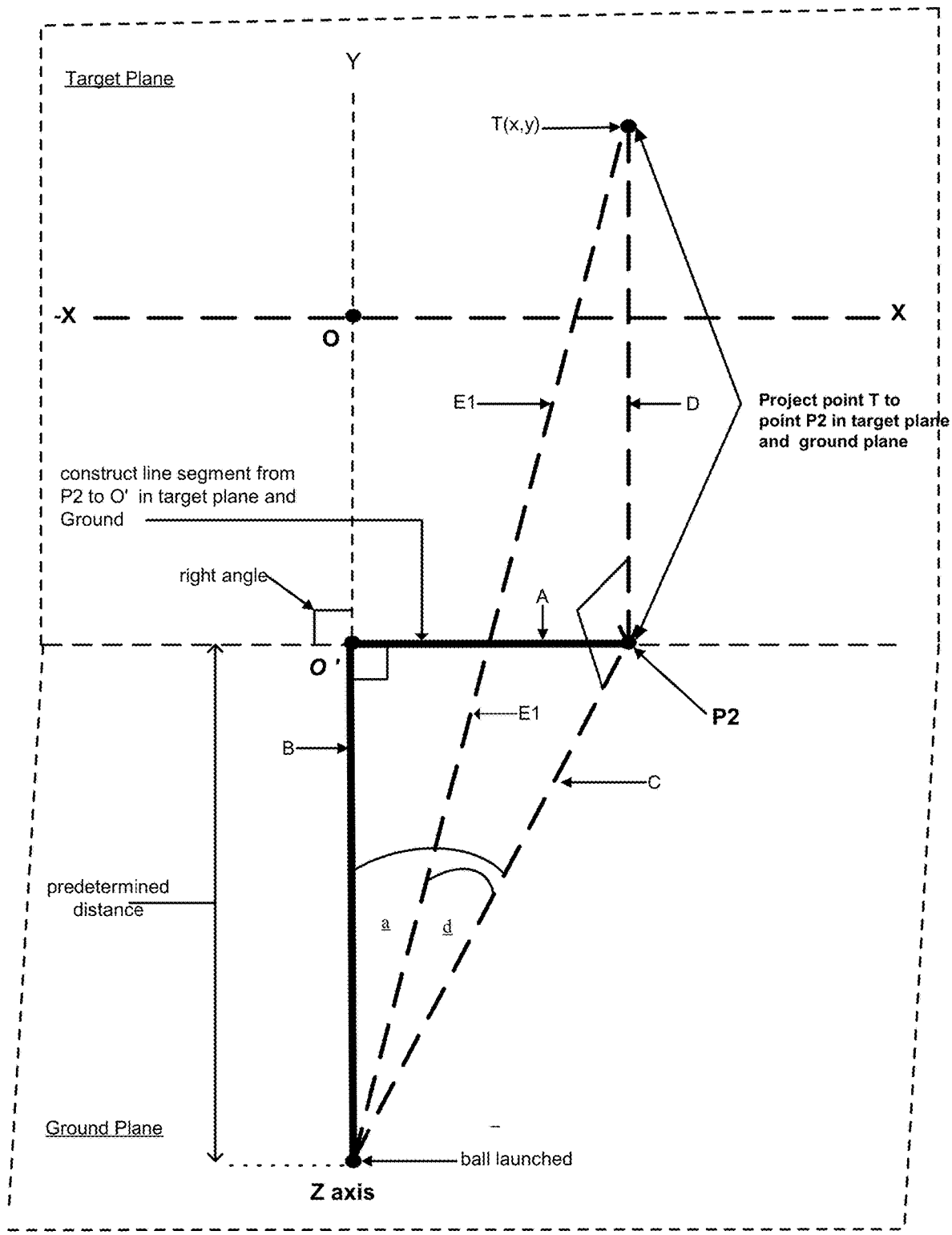

FIG. 4 shows the construction of an elevation triangle ΔLTP2 by projecting point T(x,y) to point P2, a point on the ground plane and drawing lines LT, TP2 and LP2. Triangle ΔLTP2 is a right triangle since the line TP2, in the Target plane, is perpendicular to line LP2, in the ground plane which is orthogonal to the Target plane. Trajectory triangle ΔLO'P2 is constructed by drawing lines O'P2, LO' and LP2. Triangle ΔLTP2 is a right triangle because line LO' is in the Ground and line O'P2 is line formed by the intersection of the Ground plane and the Target plane which said planes are orthogonal planes and therefore, triangle ΔLO'P2 is a right triangle because line LO' is perpendicular to line O'P2.

Figure 5:
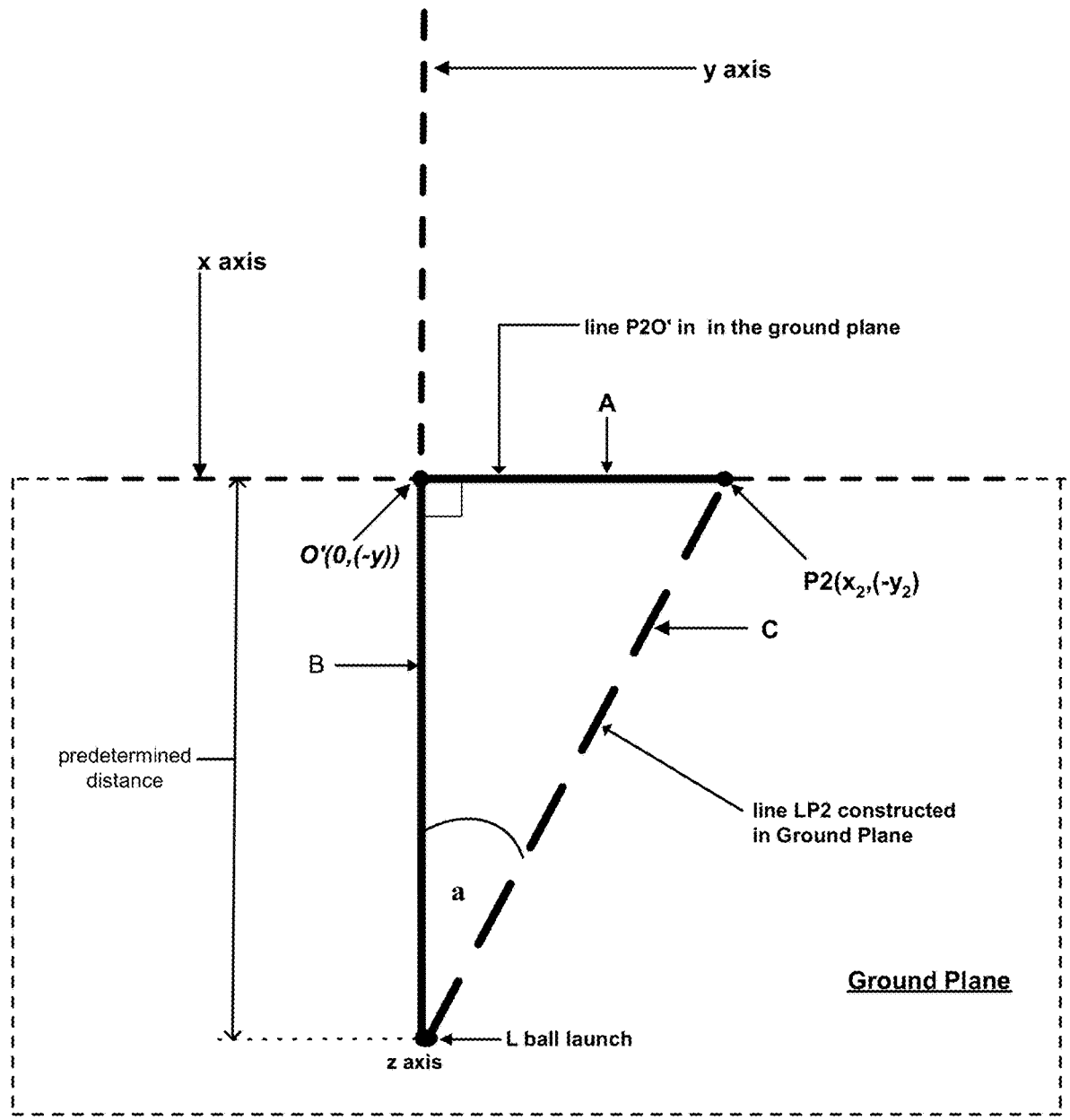

FIG. 5 shows right triangle, ΔLO'P2, and trajectory angle ∠a. Side B, the line LO', is predetermined and side A=P2 $(x_2,(y_2))$−O'$(0,(y_1))$=$x_2$. Therefore, the trajectory angle <a, is determined as follows: $\tan^{-1}$ (A/B)−<a. Thus the trajectory angle is calculable.

Figure 6:
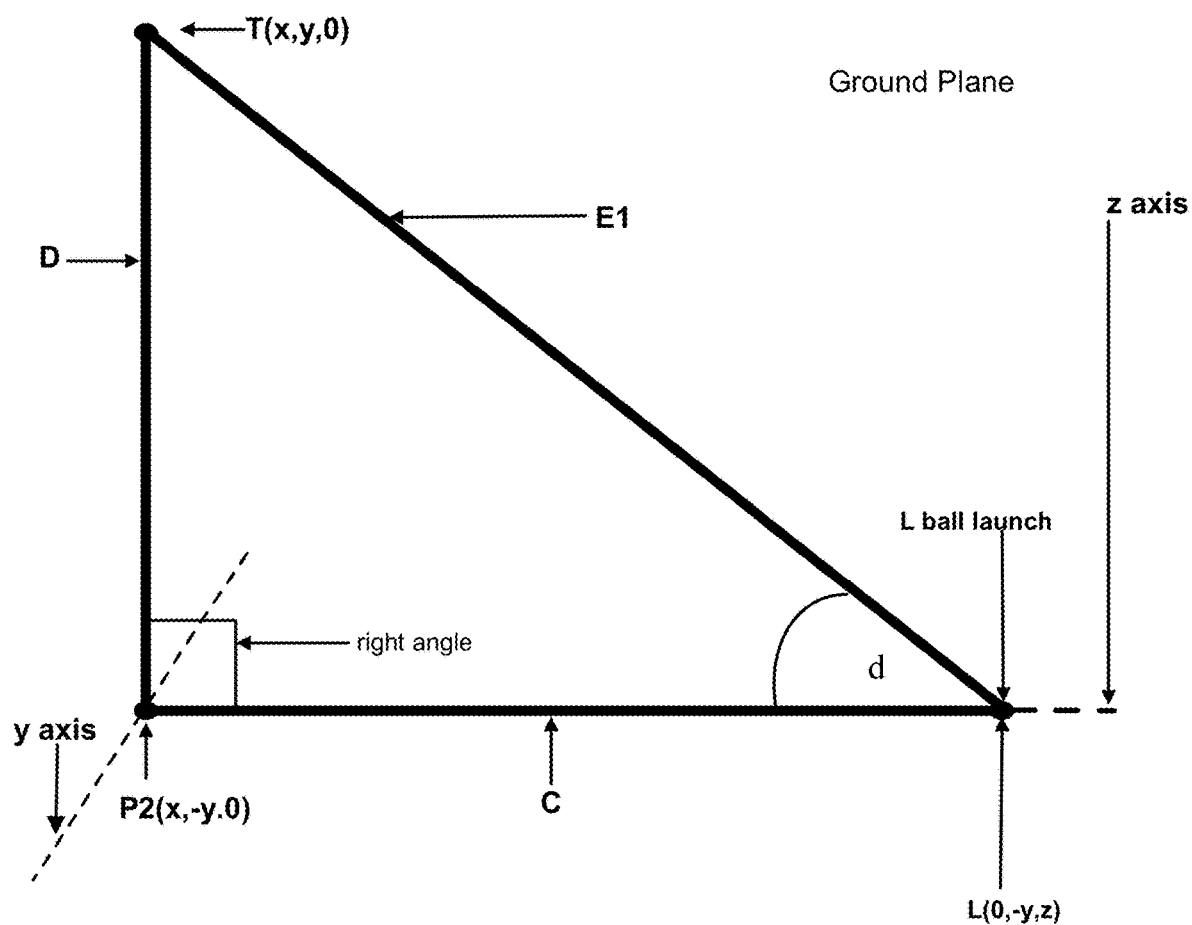

FIG. 6 shows right triangle ΔLP2T and launch angle ∠d. Since the projection of point T(x,y) to point P5(0,y) in the y-z plane preserves angle ∠d, the new launch triangle becomes ΔLO'P5. Triangle ΔLO'P5 is a right triangle since the x-y plane and the y-z plane are orthogonal. Therefore, the launch angle is equal to, $\tan^{-1}$(LP5/B)=<d, where side LP5 is the side formed by the projection of point T(x,y) to point P5(0,y) and drawing the line LP5; side B is the predetermined distance from point L, in the Ground plane to point O' which is on the line formed by the intersection of the x-y plane and the Ground plane, said planes being orthogonal. Therefore, <d=$\tan^{-1}$ ((P5(0,$v_1$)−O'(0,$y_2$))÷B= ($y_1$−$y_2$)÷B, thus the launch angle is calculable.

Figure 7:
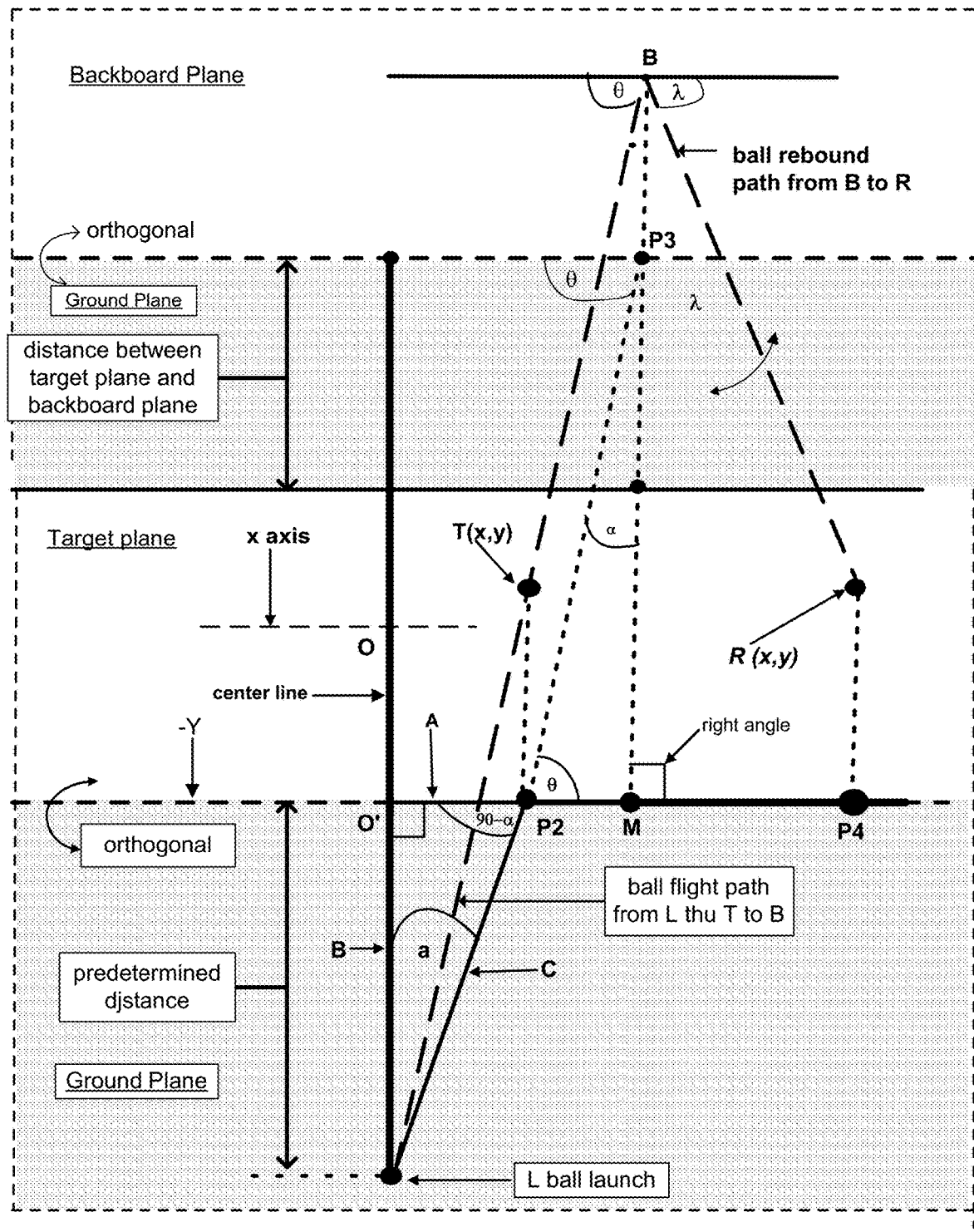
Figure 8:
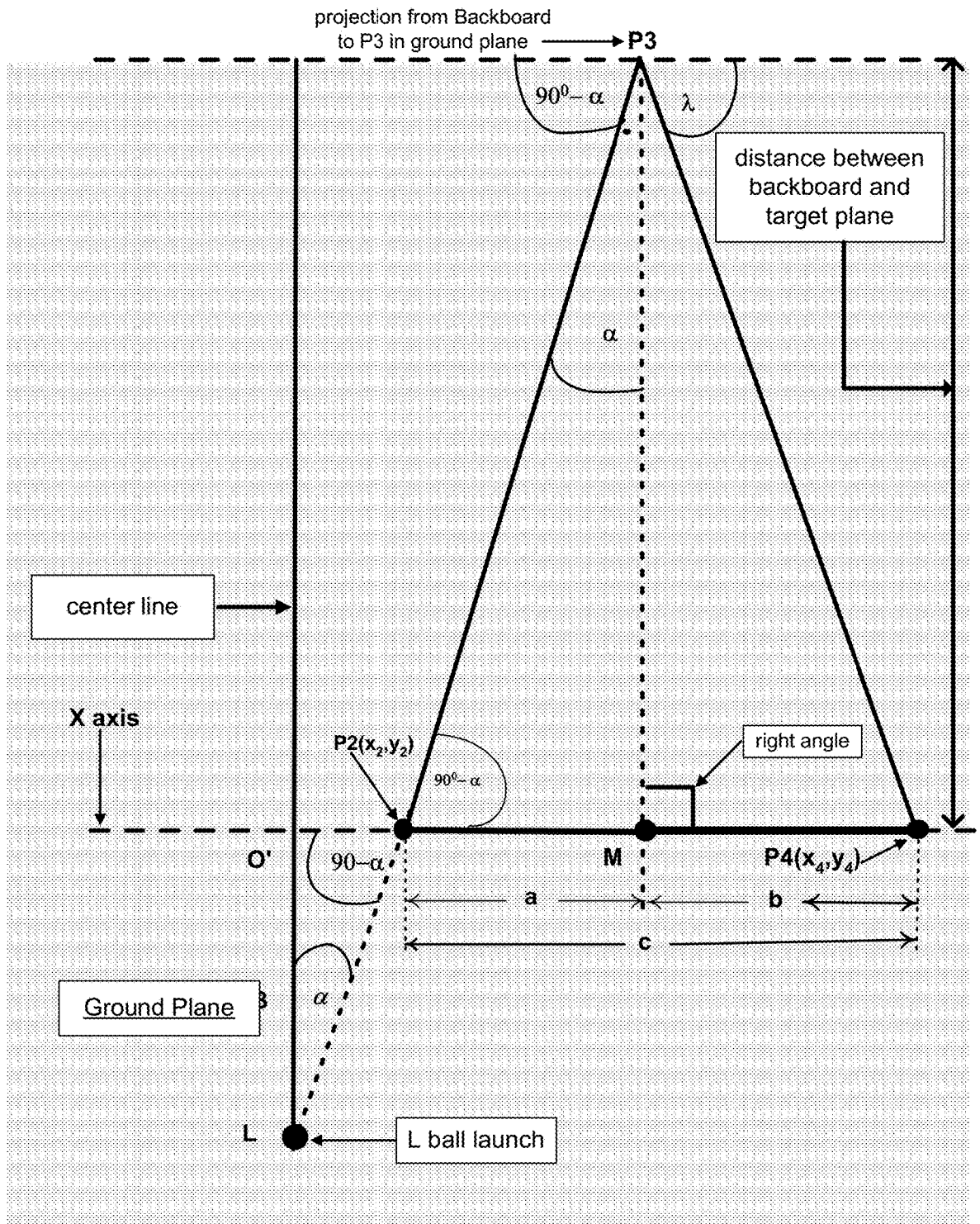

FIG. 7 shows the launch projectile going through the Target plane at point T and continuing to point B in the Backplane. The Target plane and the Back plane are parallel and both said planes are orthogonal to the Ground plane. FIG. 8 also shows the following: the perpendicular projection of point T (x,y) in the Target plane to point P2 in the ground plane; the perpendicular projection of point B, the projectile rebound point from the Back plane, to P3 on the Ground plane; the rebound projectile path from point B, back through the Target plane to point R(x,y) in the Target plane; the perpendicular projection from point R(x,y) to P4 in the Ground plane; and the construction of line P3M, the angle bisector of the vertex angle at point P3. Line P3M is wholly in the Ground plane and is the perpendicular distance from the Backplane to the Target plane and is predetermined. By these methods, ΔP2P3P4 is constructed.////

The trajectory angle, <a in FIG. 5, is equal to angle $\tan^{-1}$(A/B)=<a, and therefore Theta (□), the incidence angle to the Target plane and the Back plane, is equal to (90°−a)=□□□ In triangle ΔP2P3P4, the angle bisector of vertex angle P3 is line P3M and is perpendicular to line P2P4.

FIG. 8 shows that incidence angle is the complement of the trajectory angle ∠a. The trajectory angle in FIG. 6, is equal to angle angle <a, and therefore, the incidence angle to the Target plane and the Back plane, is equal to (90°−a). In triangle ΔP2P3P4, the angle bisector of vertex angle at P3 is line P3M and it is perpendicular to line P2P4. Assuming, for the moment, that the incidence angle to the Backplane is equal to the reflected angle (λ) from the Backplane, then that would form an isosceles triangle ΔP2P3P4. Consequently, two congruent right triangles, namely, ΔP2P3M and ΔP4P3M would be formed, where side P2M equals side P4M and side P3M is common to both triangles. Side P3M is a predetermined, perpendicular distance between the Backplane and the Target plane which are parallel planes. The congruent right triangles are in the Ground plane. If the aforementioned triangles are congruent, then the length of side P2M is equal to the length of side P4M. In actuality, the aforementioned triangles may not be congruent and side P2M may not equal side P4M as shown in FIG. 8. In either case, the distance from point P4 to point M is equal to the total distance between P2 and P4 minus the distance between P2M. The distance between point P2 and point M is calculated as follows: Tan (90°−a)=P3M/P2M so, P2M=Tan (90°−a)/P3M, where P3M is the predetermined distance between the Target plane and the Backplane and incidence angle ∠(90°−a) is the complement to trajectory angle La, which is calculable. The side P4M is calculated as follows: P4M=((P4($x_3$,$y_3$))−P2($x_2$,−$y_2$))−P3M and it follows that, $(x_3-x_2)-P2M=P4M$. This can be simplified by the equation, $c-a=b$, as shown in FIG. 8.

In FIG. 8, if side b is greater, in terms of absolute value, than side a then, the reflected angle Lambda ($\lambda$) is less than the incidence angle. This phenomenon is caused by a predominantly horizontal clockwise or, counter-clockwise spinning of the projectile as it hits the Backplane. If side b is less than side a, in terms of absolute value, then, the reflected angle Lambda ($\lambda$) is greater than the incidence angle. This is caused by a predominantly horizontal clockwise or counter-clockwise spinning of the projectile as it hits the Backplane. If the incidence angle equals the reflected, then the predominant horizontal spin direction at impact with the backplane does not affect the reflected angle and the absolute value of side a equals side b are equal and that equates to zero side spin.

FIG. 9 shows a Golf Shot Table listing a Ball Flight column with elements describing an initial ball flight path after being launched from point L and a ball flight path after rebounding from the Backplane. Note 1, in FIG. 9, explains that a ball in free flight will move in the opposite direction of its horizontal spin. For example, a ball starting out to the right and then turning left is defined as a "draw" and has clockwise spin. The second column is titled Ball Spin and it has elements describing the direction of horizontal ball spin upon contact with the Backplane. The third column is titled Rebound and it shows an equation that determines a direction of horizontal spin, or no effective horizontal spin denoted by the word, "none" and is determined by one of three spin values calculated by the equation, $Z=|a|-|b|$, where the absolute value of side b is subtracted from the absolute value of side a. Side a and b are shown in FIG. 8. The forth column in said table is titled Golf Shot and its elements describe a characterization of the resultant golf shot produced by the ball's trajectory and spin. All calculations are based on a user of the apparatus aligning the launch location ("L"), the point where the ball is launched, with the horizontal physical center of the target zones. The vertical electrical center of the Target zones is the physical midway point between the vertical transmitters. Depending on the physical size of the Backplane, the vertical and horizontal electrical center can be adjusted by programmatically adjusting the electrical center of the Target zones.

Figure 10:
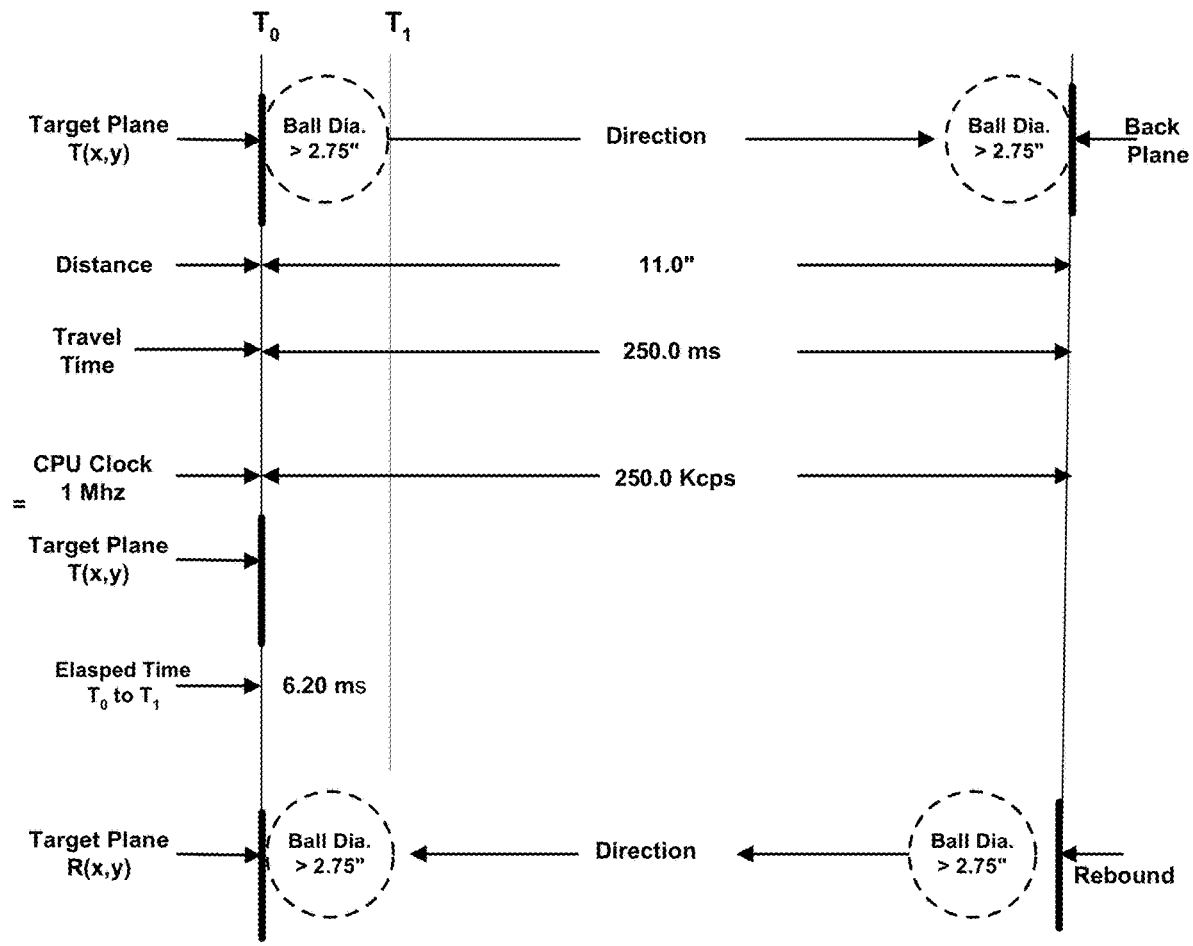
FIG. 10, Timing Diagram, shows an example of the various elements of consideration when specifying a CPU, clock speed and a distance between the Backplane from which the ball will rebound back through the target zones. The parameters shown in FIG. 11 are based on an example ball speed of 30 mph and entering the Target zone at point T(x,y).
Figure 11:
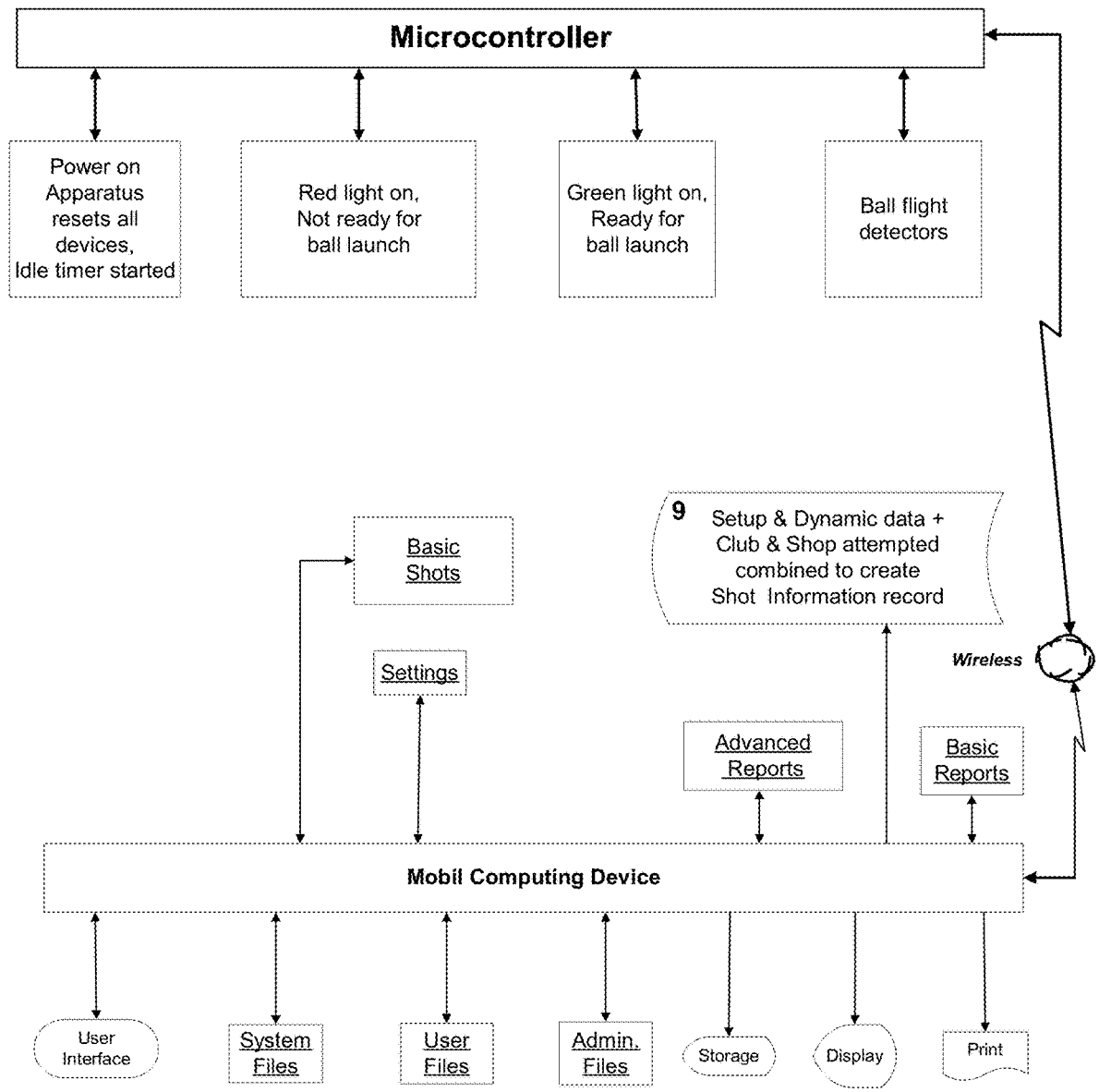
FIG. 11, Application Flowchart, shows a system flowchart depicting a system, comprising various functional components including an application installed on a microcontroller and an application installed on at least one computing device.

FIG. 10 shows a Timing Diagram with an example of the various elements of consideration when specifying a CPU, clock speed and a distance between the Backplane from which the ball will rebound back through the target zones. The parameters shown in FIG. 11 are based on an example ball speed of 30 mph and entering the Target zone at point $T(x,y)$. An example clock speed of 1 MHz allows sufficient time for the horizontal and vertical receivers to pass on their signals through the system, reset and await the rebounding ball from the Backplane. In this manner, the entry point signals from $T(x,y)$ are passed through to the microcontroller, which resets the system in time to await the rebound exit signals from $R(x,y)$ to the microcontroller for further processing. Higher clock speeds allow more time for processing and faster ball speeds. For example, a ball speed of 60 mph would give the example clock speed at least 250 milliseconds to process the entry signals and exit signals from the Target zone sensors. Suitable microcontrollers have CPU clock speeds well over 100 MHz and as the diagram shows, there will be no issues with timing.

Microcontroller: The microcontroller functions to control the system hardware including, the transmitters, receivers, the latches, the cascaded priority encoders, power to said devices and the processing of signals coming from and going to the aforementioned devices. In this embodiment, the microcontroller communicates with an application running on at least one mobile device. Said microcontroller has a plurality of applications installed on the microcomputer including, an operating system, a communications component, a client-server application, a wireless networking component, a computer readable medium comprising the algorithms and instructions to carry out the functions described herein. The following functions are carried out by the microcontroller.

Normalization Process: The Normalization process is carried out by an algorithm installed on the microcontroller, as follows. The cascaded priority encoders convert its respective data inputs from the horizontal and vertical latches, into their respective $base_{10}$ numbers. These $base_{10}$ numbers are passed onto the input/output (I/O) bus of the microcomputer. The Normalization process is defined here as the process of converting the digitally encoded $base_{10}$ horizontal and vertical outputs from the cascaded priority encoders, into receiver position values in an x-y plane in an x-y coordinate system. The horizontal $base_{10}$ numbers from 1 to n and the vertical $base_{10}$ numbers from 1 to m are normalized by a process of converting them into x and y coordinates in the x-y plane. The normalizing process operates the same for both horizontal and vertical $base_{10, digitally}$ encoded numerical values. The total number of horizontal or vertical receivers is determined by inter-relating factors comprising the height and width of the apparatus and the diameter of the ball used. The preferred embodiment in this invention uses an example ball diameter of greater than 2.5 inches, but less than 2.75 inches, wherein the purpose of this constraint is to make it impossible for the ball to traverse the Target Plane and not interrupt the light going to at least one receiver, but also to minimize the possibility of the ball interrupting the light going to two receivers, The size of the ball and a distance between receivers and transmitters holes are directly related. For the purpose of this example, which is not a limitation, the height and width of the frame are equal to each other and the total number of receivers is 74; that is, 37 horizontal receivers and 37 vertical receivers spaced 2.5 inches apart. Therefore, the physical center of the apparatus is located at the horizontal and vertical receivers numbered $H_{19}$ and $V_{19}$. In this exemplary embodiment, the horizontal normalization process for the x coordinates, we let $_HT_n$ equal the total number of horizontal receivers, so $_HT_n=37$. If the total number of vertical receivers, $_VT_m$, is not equal to $_HT_n$, then $_VT_m$ is used for the vertical normalization process for the y coordinates. The algorithm in this embodiment uses the number T=37 to compute a normalization factor for both the x and y coordinates. The normalizing factor, a, is calculated using the following formula: $a=((T-1)\div 2)-T)=-19$; where, $T=37$ is equal to the total number of horizontal receivers and $T=37$ is equal to the total number of vertical receivers. The normalization process creates negative, positive, and zero coordinate values in the x-y plane by mapping physical receiver position values such as, $_hR_{x(1\ to\ n)}$, to decimal numbers, $H_{(p+a)}$, where p equals the numerical value for physical location of a receiver. For example the $1^{st}$ receiver among the 37 horizontal receivers would equate to $_hRx_{(p)}=H_{(1+a)}=H(-18)$ and then normalizing $H_{(-18)}$ to $=x_{(-18)}$. The $37^{th}$ receiver among the 37 horizontal receivers would equate to $_hRx_{(p)}=H_{(37+a)}=H(18)$ and then normalizing $H_{(18)}$ to $=x_{(18)}$. The vertical coordinates, given T=37, are computed in the same manner such that, $_vRx_{(1)}=V_{(1-a)}=V(18)$. In the case where both the horizontal and vertical receiver's position numbers are equal to 19, that is p=19, then $_hRx_{(p)}=H_{(19+a)}=H_{(0)}$ and therefore, the x coordinate=$x_{(o)}$; and $_vRx_{(p)}=V_{(19+a)}=V_{(o)}$ and therefore, the y coordinate=$y_{(o)}$. So, in this example, the coordinates of a ball crossing the Target plane and activating the receivers corresponding to the point $x_0,y_0$ in the Target Plane, would have traversed the Target Area at its center.

Target Zone: A Target zone is defined as a circle whose center is at an origin in the x-y plane and whose radius is any coordinate point not at that origin. A Target Zone is an illustration used to convey to the user the image of a bullseye target zone. A score is based on the straight line distance from the center of a Target zone, to the x,y coordinate of the location where the simulation golf ball crossed the Target plane. A plurality of Target zones or concentric circles, can be mathematically computed by holding the origin or center of each concentric circle at x=0, y=0 and letting the radius of said circles increment from 1 to n, where $x_n=y_n$.

Scoring Function: A scoring function is created to provide feedback to the user in terms of their accuracy in launching a ball closest to the center of the Target Zone. Another embodiment of this invention allows a plurality of users to compete with each other on the basis of scores. A score can range between zero (0) and 100. The user's score is determined by how close to the center of the Target Area a user's ball crosses the x-y plane. Whenever the user's ball crosses the Target Area, horizontal and vertical sensors are triggered and cause signals to be sent to the microcontroller as described above. When the microcontroller receives the BCD data on its input ports, the microcontroller uses the normalization algorithm to computer a first set of x-y coordinates corresponding to a ball traveling in a forward direction through the Target Area and a second set of x-y coordinates corresponding to a ball traveling in a reverse direction through the Target Plane. Both sets of x-y coordinates are stored in temporary memory and used to calculate a score, a trajectory, an elevation and a type of golf shot for each user's golf shot. The Normalization process produces a first set of x-y coordinates corresponding to the location of the ball's initial flight through the Target Area and the Normalization process produces a second set of x-y coordinates corresponding to the location of the ball's rebound flight through the Target Plane. The scoring function uses the first set of x-y coordinates to calculate a score, a trajectory, and an elevation. The second set of x-y coordinates is used by a spin algorithm to calculate a direction of horizontal ball spin. The closer the x-y coordinates of the ball to the mathematical center of the Target Area, the higher the score. Additionally, more information is provided to the user in terms of what part of the Target Area was crossed by the user's ball. For example, the Target Area is divided into 4 quadrants as follows: i) an upper left quadrant (UL); ii) an upper right quadrant (UR); iii) a lower right quadrant (LR); and, iv) a lower left quadrant (LL). A quadrant locator algorithm is executed, which maps the first set of x-y coordinates to one of four quadrants according to their negative and positive values as follows: (x,y)=UR quadrant; (−x,y)=UL quadrant; (−x,−y)=LL quadrant; and (x, −y)=LR quadrant. The algorithm executes a scoring function to compute a single value. The scoring function produces a score of 100 for any ball whose coordinates are $x_0,y_0$. For any ball whose x-y coordinates in the x-y plane are not $x_0,y_0$, the microcontroller application calls a distance function and multiplies the absolute value of this function times a distance factor. The result of the above computation is then subtracted from 100 to produce a score. The distance factor is a function of the size of the Target Area, the distance between adjacent sensors and the total number of horizontal and vertical sensors. In this embodiment, there are 37 horizontal and 37 vertical sensors and the holes wherein the receivers and transmitters are situated, are spaced 2.5 inches apart. The hole spacing and the size of the target area are relative. Therefore the purpose of the distance factor, C, is to equate the lowest possible score to 1, wherein if the ball goes outside of the Target Area, the score is not calculated. The following equations compute the C factor for this embodiment: $100-C(in.)\sqrt{((18*2.5 \text{ in})^2+(18*2.5 \text{ in})^2)}=0$, where 100 is the highest score and $C*(\sqrt{((18*2.5 \text{ in})^2+(18*2.5 \text{ in})^2)})$ is the lowest score, where C(in.) is the distance factor, 2.5 in equals the spacing in inches between the holes and 18 equals (37−1)/2), the number of x and y coordinates in their respective quadrants, excluding coordinates $x_0$, $y_0$. Simplifying, we get $C=100 \div \sqrt{6.25((45)^2+(45)^2)}$. The equation can be further simplified to: $C=100/\sqrt{((45)^2+(45)^2)}$, therefore $C=100/63.6=1.57$. Since the score is relative. The 2.5 inches can be dropped in favor of a simpler equation thereby increasing the C factor to C=4 (rounding up from 3.9) and providing virtually the same score. The scoring function, S, then, is as follows: f of $S=100-C\sqrt{\{(X^2)+(Y^2)\}}$, where X and Y are the coordinates of the location where the ball first crossed the x-y plane. For example, if normalized coordinates X=3 and Y=4, then $S=100-C*5=100-20=80$. The lowest score follows when X=18 and Y=18, and C=3.93, as follows: $S=100-(25.5*3,9)=1$ (rounding down). No score is calculated if the ball completely misses the Target Area. The calculated score is then stored in memory along with the quadrant information. In the example), where X=3 and Y=4, the score S, equals=80 and the quadrant=UR. The value written to temporary memory would be UR80. The values for scores written to temporary memory include, date and time and other information such as, the type of golf club used; a 9-iron, for example and the intended golf shot, a "draw" for example. As described in the flowchart, information is stored in memory just after the shot and this information is appended to the scoring information and together, comprising Shot Information. The result of a golf shot is stored in memory for later processing.

FIG. 5 shows the geometry and projections supporting the below algorithms written in pseudo code and used in the calculating a Trajectory Angle:

/* Calculate Trajectory Angle, ∠ a */
1.    Side A = P2($x_2,y_2$)) − O'($x_1,y_1$)
2.    Side A = 2.5 in. ($x_2$ 0)
3.    Side B = LO' = 120 in. /* line LO' is 120 in. in this example */
4. $\angle a = \tan^{-1}\left(\frac{A}{B}\right)$ /* see FIG. 6 */
5.    ∠ a = $\text{Tan}^{-1}((2.5*x_2)/120)$   /* side B = 120 in. in this example */

FIG. 6 shows the geometry and projections supporting the below algorithms written in pseudo code and used to calculate Launch Angle:

/* Calculate Launch Angle or elevation, ∠ d *
1. Tan (∠ d) = (D/C)
2. ∠ d = $\text{Tan}^{-1}$ (D/C)
3. Side A = P2 ($x_2$ , 0) − O'(x,0)
4. Side A = 2.5 in. * ($x_2$ − x)
5. Side C = $\sqrt{((2.5 \text{ in.})*A)^2 + B^2)}$
  /* 2.5 in. = spacing between holes */
6. Side B = LO' = 120 in. /* example distance to Target Plane */
7. Side D = T($x_1,y_1$) − P2($x_2,y_2$)
8. Side D = 2.5in.($y_1$ − $y_2$)

9. $\angle d = \text{Tan}^{-1} (y_1 - y_2) / ( \sqrt{(A^2 + B^2)} )$
10. $\angle d = \text{Tan}^{-1} 2.5 * (y_1 - y_2) / ( \sqrt{((2.5*A)^2 + (120)^2)}$
11. /* $\angle d$ equals launch angle */

FIG. 8 shows a Golf Shot Table depicting how the ball's horizontal spin, or no spin, coupled with the ball's initial direction, and classifies the user's resultant golf shot. The ball's spin is determined to be clockwise, counter-clockwise, or zero (no effective horizontal spin) by determining whether the reflected angle off the Backplane is greater than, less than, or equal to the incidence angle in combination with the ball's initial flight. The trajectory angle and the launch angle are computed and used to determine the resultant type golf shot. Balls that do not rebound through the Target Plane are considered to be "straight left" or "straight left." Balls that do rebound through the Target Plane are defined herein as golf shots and further characterized by type of golf shot. FIG. 10 shows a Golf Shot Table, for right-handed golfers, listing, a plurality of Ball Flights, a plurality of Ball Spins off the Backplane, a Z factor and a plurality of Golf Shot Classifications. The classification of each golf shots is herein based on a unique combination of an initial ball flight in the air and a particular horizontal ball pin. Said ball flight is here further defined as a ball having an initial trajectory and a final horizontal bounce direction off the Backplane. Said ball, as defined here, can have no spin, a clockwise spin, or a counter-clockwise spin in a horizontal plane parallel to the Ground plane. The process of determining the type of golf shot a user has hit, involves determining the initial ball flight and the horizontal spin component of the ball's trajectory. The initial ball flight is determined by which quadrant the ball first crosses. For the purpose of golf shot determination, only the value of the x coordinates are of concern. If x is positive, then the ball's initial trajectory is to the right. If x is negative, the ball's initial trajectory is to the left. If x equals zero, the initial trajectory is straight. The following geometry and projections support the below algorithms written in pseudo code and used to calculate Ball Spin:

/* Golf Shot Determination */
/* First calculate the Trajectory Angle which is the compliment of the incidence angle */

1. $\angle a = \tan^{-1}\left(\dfrac{A}{B}\right)$ /* see FIG. 6 */

/* Side a = the distance between P2 and M (see FIG. 8 */
2. Side a = P2M = P3M / Tan$^{-1}$ (90° - <a)
3. Side a = 6 in. / Tan$^{-1}$ (90° - <a)
   /* P3M = 6 in. = distance between the Target plane and the Backplane */
   /* Incidence angle, (90° - a) is the complement to <a */
   /* Side b = the distance between P4 and M (see FIG. 8 */
4. P4M = b * 2.5 in. /* P4M equals the distance between P4 and M */
5. P4M = ((P4($x_4,y_4$)) - P2($x_2,y_2$)) - P2M */ and it follows that, */
6. P4M = 2.5 in. * ($x_4 - x_2$) - ((6 in.) / Tan (90° - a))
7. Side b = 2.5 in. * ($x_4 - x_2$) - ((6 in.) / Tan (90° - a))
8. Side a = P3M / Tan$^{-1}$ (90° - <a)
9. Side c = side a + side b
   /* Calculate the absolute vale of side a and side b, see FIG. 9 */
10. Let Z = |a| - |b|
11. If Z = 0 and x > 0 then, "Golf Shot" = push
12. If Z = 0 and x = 0 then, "Golf Shot" = straight
13. If Z = 0 and x < 0 then, "Golf Shot" = pull
    /*       */
14. If Z > 0 and x > 0 then, "Golf Shot" = push-slice
15. If Z > 0 and x = 0 then, "Golf Shot" = slice
16. If Z > 0 and x < 0 then, "Golf Shot" = pull-hook
    /*       */
17. If Z < 0 and x > 0 then, "Golf Shot" = draw
18. If Z < 0 and x = 0 then, "Golf Shot" = hook
19. If Z < 0 and x < 0 then, "Golf Shot" = fade FIG. 10 shows an example the various elements of consideration when specifying a CPU, clock speed and a distance between the Backplane from which the ball will rebound back through the target zones. The parameters shown in FIG. 11 are based on an example ball speed of 30 mph and entering the Target zone at point T(x,y). An example clock speed of 1 MHz allows sufficient time for the horizontal and vertical receivers to pass on their signals through the system, reset and await the rebounding ball from the Backplane. In this manner, the entry point signals from T(x,y) are passed through to the microcontroller, which resets the system in time to await the rebound exit signals from R(x,y) to the microcontroller for further processing. Higher clock speeds allow more time for processing and faster ball speeds. For example, a ball speed of 60 mph would give the example clock speed at least 250 milliseconds to process the entry signals and exit signals from the Target zone sensors.

FIG. 11 shows a flowchart depicting a system, comprising various functional components including, an application installed on a microcontroller and an application installed on at least one computing device. Box 1, Microcontroller, controls the hardware devices associated with functional descriptions in the various boxes. A Main Menu box, controls the, is the starting point in an application run on at least one computer. Boxes 2-4 are part of a power on/reset and idle timer circuit. At power on, a red light, indicating that the hardware is not ready to operate, is switched on until all circuits are stabilized. Following stabilization, a green light, indicating that the hardware is ready to operate, is switched on; the red light is switched off and a ball detector circuit in Box 5 is initialized. Box 5 includes a plurality of horizontal and vertical sensors. If a ball is not detected in a given time period, the ball detector circuit switches off the green light, switches on the red light and awaits instructions from a Basic Shots routine in Box 6. The state, or readiness of the hardware to operate, is monitored in Box 7 and transmitted over a communications channel to said application running on at least one computer. Said communications channel is noted in the flowchart by a number 8 surrounded by a circle. When a ball is launched such that it crosses a field of sensors, at least two sensors are triggered, one in the horizontal field and one in the vertical field, and in turn said sensors send location data, including incident and rebound data, to Box 7. Box 7 temporarily stores the location data from Box 6 and computes a plurality of statistics, comprising: a score, an elevation angle, a trajectory angle and a characterized golf shot and other such data, which is sent to said application running on a computer which in turn uses said statistics to perform additional functions to produce a Shot Information record shown in Box 9. Box 9 also includes a set of golf shot input parameters, comprising: a type of golf club used to launch the ball, a type of golf shot intended, an open set of setup parameters, and an open set of dynamic swing parameters sent to Box 9 when a golf shot is detected. Said application has additional features and performs additional function depicted in other boxes which are not numbers. Said additional functions are asynchronous and described in more detail in the following drawings described in FIGS. 13-19'

FIG. 12 shows an Application Main Menu page configured to guide a user through the use of the invention. Before the Main Menu selections are available to a user, the user must sign in with a username in order to activate a multi-user application; a password is optional. The owner of the system is assigned an administrator's username called "admin" and a password called "password." The administrator's password can be changed by the administrator. Each user is assigned a separate location in memory where all the users' files are stored. Common files are assessable to all users. Administrator's files and commands are only assessable to the Administrator or owner. As the various icons are selected, the application takes the user to the various pages described by the icons.

FIG. 13 shows the "Settings" page. This is where the user can edit the fields listed on the Settings pages, namely, 1) "Distance to the Target"—in feet; and 2) "Move Target Center"—the user is allowed to electronically relocate the electrical origin from the physical center of the Target area to a logical center to accommodate different golf clubs and golf shots. The input range is limited by the dimensions of the Target Area. For example, the user can move the electrical center from x=0, y=0 to x=0, y=10, by entering the number 4 next to up arrow and leaving zeros next to the other arrows. This moves the target center up 10 inches based on hole spacing of 2.5 inches; 3) "Clubs in the Bag"—the user is presented with a list of golf clubs. The user can accept the list as presented or, edit the list to correspond to the type of golf clubs included in the golfer's golf bag; 4) "Pre-swing Setup"—the user is presented with a list of Pre-swing setup options. The user can edit this list to add, delete or modify items on this list. In addition, the user can move the adjustment slider indicated by three (3) asterisks next to the slider. For example, the slider next to "grip" when moved to the right will register values from 1 to 3, with 3 indicating a very strong grip. When the slider is moved to the left, it registers values from –1 to –3, with –3 indicating a very weak grip. The boxes adjacent to the list of items in the "Pre-swing Setup list," if selected, a dot will appear in the box and this item will be stored in the user's "Club selected/shot intended" file. All boxes left empty, will not be stored in the user's shot profile; 5) "Dynamic Swing Adjustments"—the user is presented with a list of dynamic swing adjustments options. The user can edit this list to add, remove or modify items on this list as described in 4 (above), titled "Pre-swing Setup" and stored as previously described (above). For example, a user could make certain changes in "Settings" and then decide to restore those changes to their default values by selecting the item and then clicking on restore. A user could add "misses" or "grounders" to the Standard Shots file. A user could add a "left toe" item to the Pre-Swing Setup table coupled with the Adjustment Slider choices of, "out-S-in" where "S" stands for square to the target. A user can modify or edit the Dynamic Swing Adjustment table in the same manner just described for the aforementioned files. The Legend gives definitions of abbreviated Adjustment Slider option. The user can select "arrow" to go back to the Main menu or, select the "Done" which takes the user to the Basic shots page. The user is required to create a "Shot profile for each club used/shot intended combination in "Settings." Once created in "Settings," the "Shot profile" will be made available in the Basic Shots" page for each club used and shot intended.

Figure 14:
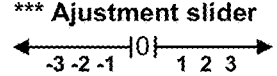
FIG. 14—Basic Shots: When the "Basic Shots" icon is selected, the application takes the user to a page where the user can hit basic shots. Each selection on the Main Menu takes the user to a different page in the application.

FIG. 14 shows a "Basic Shots" page. First time users will have the Setup and Swing parameters automatically loaded from the user's "Settings" page. The user has the option to accept these defaults, or make changes by selecting the respective "Setup" or "Swing" buttons shown in FIG. 15. When the green light lit on the apparatus, the user can hit shots. After each user's shot, "Shot data" is created by the microcontroller and is transmitted from the microcontroller to at least one computing device. This shot data comprises a Score, a Trajectory, an Elevation angle and a Shot Characterization as previously described hereinabove. The at least one computing device creates a record in a user's Shot Information file and appends the Pre-shot data to the open record. This appended information includes the current Pre-shot data including, the "Club used," the "Shot intended," the Pre-Swing Setup parameters selected and the Dynamic Swing items selected in the Dynamic Adjustments. Each user's shot must include the information or, the green light will light on the apparatus. The user can hit a multiplicity of shots using the same club used/shot intended combination. When the user desires to either change clubs or shot intended, the user can make changes in the "Basic Shot" mode to the Pre-Swing Setup parameters and/or to the Dynamic Adjustments parameters, unless a "Shot profile" does not exist in the Basic Shot mode for that club used/shot intended combination. If a "Shot profile" does not exist in Basic Shot mode for the requested combination, the user must go to "Settings" to create one. When selected, the shot modes tell the microcontroller to wake up and prepare the sensors to detect balls crossing the Target plane, as described under Microcontroller. After each golf shot is handled by the microcontroller, it sends Shot Information to the application and waits, a period of time, for either additional golf shots or, addition instruction from the application. A red light appears on the apparatus after a period of inactivity informing the user that the apparatus is not ready to receive shots. When the microcontroller is ready to accept golf shots, a green light is shown on the apparatus. After a period of inactivity, the microcontroller sets all the sensors to an idle mode thereby conserving power and extending the life of the sensors.

FIG. 15 shows the "Basic Report" page. The user is allowed to create a basic report by selecting a box adjacent to the listed items in column one. The sort order of the report created is controlled by the order in which the user selects the items to be in the report.

FIG. 16 shows the "Advanced Report's" page where the user can create a more comprehensive report than the Basic report. The user can select report fields an establish criteria for inclusion in the report.

Golf Swing Improvement: As explained, a typical golf shot can be characterized by at least one of the elements listed in the Golf Shot Table of at least 9 items as shown in FIG. 10. Once a golf shot as been characterized, the input parameters that produced said golf shot, comprising: an open set of setup keys, including, grip, stance, posture, aim, clubface, ball position and so on as illustrated in FIG. 14; and an open set of swing keys, including, backswing, downswing, wrist cock, forearm roll and so on as further illustrated in FIG. 14; wherein a user can determine, based on a statistical analysis of the Shot Information, which of the above keys have the most impact on a user's attempt to hit a certain shot with a certain club. For example, if the user attempts to hit a "draw" with a "6 iron" a statistical analysis will identify which setup keys and which swing keys have the greatest impact, or "success rate" on the desired shot attempt with a particular golf club. The system allows for each user to an individual approach to improving his/her golf swing. An individual my decide to start with the minimum number of keys and focus only on the setup keys and then move on the swing keys and continue the process. A more skilled golfer may edit or eliminate keys and focus on his/her self-defined keys. A tyro may use the listed keys as a guide or as a coach. Another user may have a coach define the keys that the coach desires the user to work on. The following example of a learning process is not meant to be a limitation. For example, in a process of elimination, one or more of the input parameters can be eliminated if they are found to have no substantial effect on the result of the resultant golf shot. In a process of inclusion, or "locking in," certain keys can be fixed, wherein no more variation is allowed. For example, a user could lock-in an "open" club face and a "weak" grip to hit a "fade" thereby reducing the number of possible combinations of club face and grip for that shot with a given golf club. The Shot Information data is stored in memory for group analysis, but shot results are also immediately available after each shot. A golfer may decide, for example, that the clubface has more of an impact on the intended golf shot than the "elbow" or "knee bend" and decide to eliminate those parameters. The golfer may also decide that a "strong grip" within the grip parameter and a "closed" position with the clubface parameter can be "fixed" thereby eliminating combination thereby further reducing the complexity of learning. Aided by immediate and long term shot results, a golfer is able to determine which elements of the setup keys can be either fixed or eliminated. In the same manner, elements of the swing keys can be either eliminated of fixed. The order and manner of reducing its complexity and thereby reducing the time and effort to improve a user's golf swing, is not stipulated herein, nor are the number of parameters, or the descriptions thereof stipulated herein. And, neither are the elements within a parameter, nor its variations stipulated herein. Each user has the options to add, delete, or modify any and all aspects of parameters or keys without affecting the structure used to improve a user's golf swing. A golfer could chose to start with only one element of setup keys, say "strong grip" and only one element of the swing keys, say "early wrist cock" and store these choices in "Settings" for later modification as necessary. This invention enables the use, given a club selection, to determine historically which shot types are more successful, namely, a "draw," a "fade" or a "straight" shot. Going further, a golfer can determine, historically, whether a "three-quarter" 4 iron is better than a "full" 5 iron. It should be noted that "three-quarter" and "full" are choices within the element of the swing keys parameters. Certain embodiments of this invention will be evident to those skilled in the art upon reading the foregoing descriptions. The aforementioned examples and descriptions provide a clarification of the various aspects of the invention to those skilled in the art and do not serve to limit the invention. For example, there is a plurality of input and display options and combinations thereof including, keyboard, touch screen, voice input, stylus pens and large screen TV's are clearly within the scope of this invention and details thereon would overly burden one skilled in the art.

What is claimed:
1. An apparatus for a defining a target area for statistical analysis of golf swing performance, comprising:
   a structure, wherein said structure comprising at least one support structure for self-support and stability;
   a frame, wherein said frame is an integral part of said structure;
   a backboard, wherein said backboard is situated a predetermined perpendicular distance from the rear of the frame;
   a simulation golf ball, wherein said simulation golf ball is "softer" and more compressible than a regulation golf ball or, other simulation golf balls and "lighter" than the weight of a golf ball or other simulation golf balls, wherein said simulation golf ball is adapted to safe use indoors and to interoperate with said apparatus;
   a simulation ball's diameter determines a space between adjacent holes in the frame;
   wherein said frame comprising a perimeter of sides, wherein said sides comprising a strip of material for each side of the frame;
   wherein said sides includes a plurality of holes of a predetermined hole diameter and each said hole spaced apart from an adjacent hole a predetermined distance;
   said frame comprising a left side, a top side, a right side and a bottom side, wherein the left side of the frame and the right side of the frame are in a horizontal plane and the top side of the frame and the bottom said of the frame are in a vertical plane;
   said sides of the frame, wherein said terms as "left," "right," "top," "bottom," "front" and "back" are relative to a frontal orientation of the frame, wherein the left side is on an opposite side of the frame relative to the right side of the frame and the top side of the frame is on an opposite side of the frame relative to the bottom side of the frame;
   wherein said holes are equal in number in the left side to the number in the right side and said holes are equal in number in the top side to the number in the bottom side;
   wherein said holes in the horizontal plane are aligned perpendicularly from one hole to the other hole on opposite side of the frame and wherein said holes in the vertical plane are aligned perpendicularly from one hole to the other hole on opposite side of the frame;
   wherein each hole in the frame is a predetermined diameter and wherein each hole is spaced apart an equal predetermined distance from an adjacent hole;
   a plurality of optoelectronic devices, wherein said optoelectronic devices comprising at least one light transmitter and at least one light receiver;
   said left side of the frame comprising light transmitters situated in said holes and said right side of the frame comprising light receivers situated in said holes;
   said top side of the frame comprising light transmitters situated in said holes and said bottom side of the frame comprising light receivers situated in said holes;
   said frame, wherein a perpendicular distance between the left side of the fame and the right side of the frame is a width of the frame and a perpendicular distance between the top side of the frame and the bottom side of the frame is a height of the frame;
   said light transmitters comprising a first group of light transmitters situated in the left side of the frame and a second group of light transmitters situated in the top side of the frame;
   said light receivers, comprising a first group of light receivers situated in the right side of the frame and a second group of light receivers situated in the bottom side of the frame;
   said light transmitters situated in the left side of the frame are consecutively numbered, top to bottom from 1 to n and numerically paired and perpendicularly aligned with light receivers situated in the right side of the frame;

said light transmitters situated in the top side of the frame are consecutively numbered, left to right from 1 to m and numerically paired and perpendicularly aligned with light receivers situated in the bottom side of the frame;

wherein each light transmitter in the horizontal plane is set apart from it's paired receiver a perpendicular distance at least as wide as said target area within said frame;

wherein each light transmitter in the vertical plane is set apart from it's paired receiver a perpendicular distance at least as high as said target area within said frame; said frame is oriented in the vertical plane relative to the ground plane and is orthogonal to said ground plane;

a target area, wherein said target area comprising an empty space whose boundaries are defined by the width, the height of the frame and the vertical plane of the frame;

a target plane coplanar with the target area comprising an electronic x-y coordinate system, wherein said x-y coordinate system is wholly within and coplanar with the target area;

said target plane further comprising a field of perpendicularly intersecting light beams transmitted by said light transmitters in the horizontal plane and transmitted by transmitters in the vertical plane, wherein each transmitted light beam is narrowly focused on its paired light receiver situated on an opposite side of the frame;

a target zone comprising a plurality of mathematically defined concentric circles wholly within the x-y target plane, wherein said circles consist of a first point in an x-y plane and a second point in the same x-y plane located a distance away from the first point whereas a circle can be constructed using the second point as the origin of a circle and the first point is a radius of said circle;

wherein the target zone is coplanar with the target plane;

said target zone comprising an upper left quadrant, an upper right quadrant, a lower right quadrant and a lower left quadrant;

providing an electronic enclosure, wherein said electronic enclosure comprising a plurality of enclosed electronic devices, cables, connectors, a power source and a microcontroller, wherein said enclosure is operatively attached to the structure such that said enclosed devices are accessible and connectable to the optoelectronic devices situated in the frame;

said frame comprising at least one wire channel through which said optoelectronic devices are connected to the electronic enclosure;

said light receivers transmit a signal state change when a light beam focused on a light receiver is interrupted;

said electronic enclosure, comprising electronic devices, wherein said electronic devices are configured to accept state changes from said light receivers and transmit frame position values of said receiver to a microcontroller;

said microcontroller comprising a random access memory (RAM), a program memory, a wired and wireless communications component, a client-server component and a plurality of input/output (I/O) ports;

Wherein said microcontroller is configured to convert light receivers' frame position values into ball flight data;

said microcontroller further configured to transmit ball flight data to at least one mobile computing device;

said ball flight data comprising a score, an elevation angle, a trajectory angle and a golf shot type characterization;

an application installed on said mobile computing device, wherein the application is configured to interface with an operating system (OS), the microcontroller, a wireless networking component, a program memory component, a random access memory component (RAM), a client-server component, a database component, a graphical user interface (GUI) and a storage component;

said mobile computing device comprising a wireless communications component, a graphical user interface (GUI) component, a random access memory (RAM) component), a program memory component, a storage component, a client-server component, a database component and a storage component;

said mobile computing device is further configured to receive said ball flight data from the microcontroller;

said mobile computing device is further configured to define pre-shot data comprising a golf shot intended, a golf club used, a plurality of setup keys and a plurality of swing keys;

said mobile computing device is further configured to append the ball flight data to the pre-shot data, wherein the pre-shot data and the ball flight data are configured to form a shot information data record;

said mobile computing device is further configured to store said shot information data record in a database, wherein a date, a time and a username are appended to said shot information data record;

said mobile computing device is further configured to allow a user to view, edit, add and delete pre-shot data and to enter a comment;

wherein said mobile computing device is further configured to present to a user his/her current shot information record arranged to show a score, a quadrant, an elevation angle, a trajectory angle, a resultant type golf shot characterization, a golf shot intended, a golf club used and a golf swing analysis comprising the user's swing keys stored in the shot information record which correlate the current user ball flight data with the user's setup keys and swing keys;

said mobile computing device is further configured to allow a user to compose a plurality of basic reports against said database, wherein said application is configured to produce a statistical analysis of a user's stored shot information data, wherein said basic reports result in a basic shots report presented to the user;

said mobile computing device is further configured to allow a user to compose a plurality of advanced reports against said database, wherein said application is configured to produce a statistical analysis of a user's stored shot information data, wherein said advanced reports result in an advanced reports presented to the user; and said basic and advanced reports, wherein the user is allowed to compose report criteria, wherein a computer command is generated to access the database to produce the basic or advanced reports requested.

2. A method for defining a target area for statistical analysis of golf swing performance, comprising:

providing a structure, wherein said structure comprising at least one support structure for self-support and stability;

providing a frame, wherein said frame is an integral part of said structure;

providing a backboard, wherein said backboard is situated a predetermined perpendicular distance from the rear of the frame;

providing a simulation golf ball, wherein said ball is "softer" and more compressible than a regulation golf ball or, other simulation golf balls and "lighter" than the weight of a golf ball or other simulation golf balls, wherein said simulation said ball adapted to safe use indoors;

said ball's diameter determines a spatial distance between adjacent holes in the frame;

wherein said frame comprising a perimeter of sides, wherein said sides comprising material for each side of the frame;

wherein said sides includes a plurality of holes of a predetermined hole diameter and each said hole spaced apart from an adjacent hole a predetermined distance;

said frame comprising a left side, a top side, a right side and a bottom side, wherein the left side of the frame and the right side of the frame are in a horizontal plane and the top side of the frame and the bottom said of the frame are in a vertical plane;

said sides of the frame, wherein said terms as "left," "right," "top," "bottom," "front" and "back" are relative to a frontal orientation of the frame, wherein the left side is on an opposite side of the frame relative to the right side of the frame and the top side of the frame is on an opposite side of the frame relative to the bottom side of the frame;

wherein said holes are equal in number in the left side to the number in the right side and said holes are equal in number in the top side to the number in the bottom side;

wherein said holes in the horizontal plane are aligned perpendicularly from one hole to the other hole on opposite side of the frame and wherein said holes in the vertical plane are aligned perpendicularly from one hole to the other hole on opposite side of the frame;

wherein each hole in the frame is a predetermined diameter and wherein each hole is spaced apart an equal predetermined distance from an adjacent hole;

providing a plurality of optoelectronic devices, wherein said optoelectronic devices comprising at least one light transmitter and at least one light receiver;

said left side of the frame comprising light transmitters situated in said holes and said right side of the frame comprising light receivers situated in said holes;

said top side of the frame comprising light transmitters situated in said holes and said bottom side of the frame comprising light receivers situated in said holes;

said frame, wherein a perpendicular distance between the left side of the fame and the right side of the frame is a width of the frame and a perpendicular distance between the top side of the frame and the bottom side of the frame is a height of the frame;

said structure, comprising a backboard situated a predetermined distance behind the frame and comprising a back plane, wherein said a back plane is parallel to a target plane and orthogonal to a ground plane;

said light transmitters comprising a first group of light transmitters situated in the left side of the frame and a second group of light transmitters situated in the top side of the frame;

said light receivers, comprising a first group of light receivers situated in the right side of the frame and a second group of light receivers situated in the bottom side of the frame;

said light transmitters situated in the left side of the frame are consecutively numbered, top to bottom from 1 to n and numerically paired and perpendicularly aligned with light receivers situated in the right side of the frame;

said light transmitters situated in the top side of the frame are consecutively numbered, left to right from 1 to m and numerically paired and perpendicularly aligned with light receivers situated in the bottom side of the frame;

wherein each light transmitter in the horizontal plane is set apart from it's paired receiver a perpendicular distance at least as wide as of said target area within said frame;

wherein each light transmitter in the vertical plane is set apart from it's paired receiver a perpendicular distance at least as high as of said target area within said frame; said frame is oriented in the vertical plane relative to the ground plane and is orthogonal to said ground plane;

providing a target area, wherein said target area comprising an empty space whose boundaries are defined by the width, the height of the frame and the vertical plane of the frame;

providing a target plane coplanar with the target area comprising an electronic x-y coordinate system, wherein said x-y coordinate system is wholly within and coplanar with the target area;

said target plane further comprising a field of perpendicularly intersecting light beams transmitted by said light transmitters in the horizontal plane and transmitted by transmitters in the vertical plane, wherein each transmitted light beam is narrowly focused on its paired light receiver situated on an opposite side of the frame;

providing a target zone comprising a plurality of mathematically defined concentric circles wholly within the x-y target plane, wherein said circles consist of a first point in an x-y plane and a second point in the same x-y plane located a distance away from the first point whereas a circle can be constructed using the second point as the origin of a circle and the first point is a radius of said circle;

wherein the target zone is coplanar with the target plane;

said target zone comprising an upper left quadrant, an upper right quadrant, a lower right quadrant and a lower left quadrant;

said frame comprising at least one wire channel through which said optoelectronic devices are connected to the electronic enclosure;

said light receivers transmit a signal state change when a light beam focused on a light receiver is interrupted;

said electronic enclosure, comprising electronic devices, wherein said electronic devices are configured to accept state changes from said light receivers and transmit frame position values of said light receivers to a microcontroller;

providing said microcontroller comprising a random access memory (RAM), a program memory, a wired and wireless communications component, a client-server component and a plurality of input/output (I/O) ports;

providing at least one user account, wherein a user activates the application installed on the mobile computing device;

providing said user positioning the simulation ball on the user's golf mat such that the simulation ball is aligned with a center of a target zone;

wherein said microcontroller is configured to convert light receivers' frame position values into ball flight data;

said microcontroller further configured to transmit ball flight data to at least one mobile computing device;

said ball flight data comprising a score, a quadrant, an elevation angle, a trajectory angle and a golf shot type characterization;

said ball having been properly positioned, wherein said ball having been struck by a user, such that said ball having sufficient momentum and accuracy to traverse said target plane in a forward direction and having sufficient remaining momentum to rebound back through the target plane in a reverse direction from the backboard;

said microcontroller providing x-y coordinates of a first point in the x-y plane wherein said ball traverses the target plane in a forward direction;

said microcontroller providing x-y coordinates of a third point in the x-y plane wherein said ball traverses the target plane in a reverse direction;

said mobile computing device having received the ball flight data from the microcontroller, wherein said mobile computing device appends a pre-shot data to the shot data;

providing a user golf shot score, wherein said score is computed using a distance function comprising the distance between a first point a first point in the x-y plane where said ball first traverse the target plane in a forward direction, and a second point, wherein said second point is an origin of a circle constructed using the second point as an origin of said circle and the first point as the radius of said circle;

wherein said score is directly proportional to the radial distance away from the origin of a circle constructed using the first point as the radius and the second point as the origin, whereas the greater the radial distance from the origin, the lower the score;

providing an application installed on said mobile computing device, wherein the application is configured to interface with an operating system (OS), the microcontroller, a wireless networking component, a program memory component, a random access memory component (RAM), a client-server component, a database component, a graphical user interface (GUI) and a storage component;

said mobile computing device comprising a wireless communications component, a graphical user interface (GUI) component, a random access memory (RAM) component), a program memory component, a storage component, a client-server component, a database component and a storage component;

said mobile computing device is further configured to receive said ball flight data from the microcontroller;

said mobile computing device is further configured to define pre-shot data comprising a golf shot intended, a golf club used, a plurality of setup keys and a plurality of swing keys;

said mobile computing device is further configured to append the ball flight data to the pre-shot data, wherein the pre-shot data and the ball flight data are configured to form a shot information data record;

said mobile computing device is further configured to store said shot information data record in a database, wherein a date, a time and a username are appended to said shot information data record;

said mobile computing device is further configured to allow a user to view, edit, add and delete pre-shot data and to enter a comment;

wherein said mobile computing device is further configured to present to a user his/her current shot information record arranged to show a score, a quadrant, an elevation angle, a trajectory angle, a resultant type golf shot characterization, a golf shot intended, a golf club used and a golf swing analysis comprising the user's swing keys stored in the shot information record which correlate the current user ball flight data with the user's setup keys and swing keys;

said mobile computing device is further configured to allow a user to compose a plurality of basic reports against said database, wherein said application is configured to produce a statistical analysis of a user's stored shot information data, wherein said basic reports result in a basic shots report presented to the user;

said mobile computing device is further configured to allow a user to compose a plurality of advanced reports against said database, wherein said application is configured to produce a statistical analysis of a user's stored shot information data, wherein said advanced reports result in an advanced reports presented to the user; and said basic and advanced reports, wherein the user is allowed to compose report criteria, wherein a computer command is generated to access the database to produce the basic or advanced reports requested.

3. A system for defining a target area for statistical analysis of golf swing performance, comprising:

a structure, wherein said structure comprising at least one support structure for self-support and stability;

a frame, wherein said frame is an integral part of said structure;

a backboard, wherein said backboard is situated a predetermined perpendicular distance from the rear of the frame;

a simulation golf ball, wherein said simulation golf ball is substantially "softer" and more compressible than a regulation golf ball or, other simulation golf balls and "lighter" than the weight of a golf ball or other simulation golf balls, wherein said simulation golf ball is adapted to safe use indoors and to interoperate with said apparatus;

a simulation ball's diameter determines a space between adjacent holes in the frame;

wherein said frame comprising a perimeter of sides, wherein said sides comprising material for each side of the frame;

wherein said sides includes a plurality of holes of a predetermined hole diameter and each said hole spaced apart from an adjacent hole a predetermined distance;

said frame comprising a left side, a top side, a right side and a bottom side, wherein the left side of the frame and the right side of the frame are in a horizontal plane and the top side of the frame and the bottom said of the frame are in a vertical plane;

said sides of the frame, wherein said terms as "left," "right," "top," "bottom," "front" and "back" are relative to a frontal orientation of the frame, wherein the left side is on an opposite side of the frame relative to the right side of the frame and the top side of the frame is on an opposite side of the frame relative to the bottom side of the frame;

wherein said holes are equal in number in the left side to the number in the right side and said holes are equal in number in the top side to the number in the bottom side;

wherein said holes in the horizontal plane are aligned perpendicularly from one hole to the other hole on opposite side of the frame and wherein said holes in the vertical plane are aligned perpendicularly from one hole to the other hole on opposite side of the frame;

wherein each hole in the frame is a predetermined diameter and wherein each hole is spaced apart an equal predetermined distance from an adjacent hole;

a plurality of optoelectronic devices, wherein said optoelectronic devices comprising at least one light transmitter and at least one light receiver;

said left side of the frame comprising light transmitters situated in said holes and said right side of the frame comprising light receivers situated in said holes;

said top side of the frame comprising light transmitters situated in said holes and said bottom side of the frame comprising light receivers situated in said holes;

said frame, wherein a perpendicular distance between the left side of the fame and the right side of the frame is a width of the frame and a perpendicular distance between the top side of the frame and the bottom side of the frame is a height of the frame;

said structure, comprising a backboard situated a predetermined distance behind the frame and comprising a back plane, wherein said back plane is parallel to a target plane and orthogonal to a ground plane;

said light transmitters comprising a first group of light transmitters situated in the left side of the frame and a second group of light transmitters situated in the top side of the frame;

said light receivers, comprising a first group of light receivers situated in the right side of the frame and a second group of light receivers situated in the bottom side of the frame;

said light transmitters situated in the left side of the frame are consecutively numbered, top to bottom from 1 to n and numerically paired and perpendicularly aligned with light receivers situated in the right side of the frame;

said light transmitters situated in the top side of the frame are consecutively numbered, left to right from 1 to m and numerically paired and perpendicularly aligned with light receivers situated in the bottom side of the frame;

said frame is oriented in the vertical plane relative to the ground plane and is orthogonal to said ground plane;

a target area, wherein said target area comprising an empty space whose boundaries are defined by the width, the height of the frame and the vertical plane of the frame;

a target plane coplanar with the target area comprising an electronic x-y coordinate system, wherein said x-y coordinate system is wholly within and coplanar with the target area;

said target plane further comprising a field of perpendicularly intersecting light beams transmitted by said light transmitters in the horizontal plane and transmitted by transmitters in the vertical plane, wherein each transmitted light beam is narrowly focused on its paired light receiver situated on an opposite side of the frame;

a target zone comprising a plurality of mathematically defined concentric circles wholly within the x-y target plane, wherein said circles consist of a first point in an x-y plane and a second point in the same x-y plane located a distance away from the first point whereas a circle can be constructed using the second point as the origin of a circle and the first point is a radius of said circle;

wherein the target zone is coplanar with the target plane;

said target zone comprising an upper left quadrant, an upper right quadrant, a lower right quadrant and a lower left quadrant;

an electronic enclosure, wherein said electronic enclosure comprising a plurality of enclosed electronic devices, cables, connectors, a power source and a microcontroller, wherein said enclosure is operatively attached to the structure such that said enclosed devices are accessible and connectable to the optoelectronic devices situated in the frame;

said frame comprising at least one wire channel through which said optoelectronic devices are connected to the electronic enclosure;

said light receivers transmit a signal state change when a light beam focused on a light receiver is interrupted;

said electronic enclosure, comprising electronic devices, wherein said electronic devices are configured to accept state changes from said light receivers and transmit frame position values of said light receivers to a microcontroller;

said microcontroller comprising a random access memory (RAM), a program memory, a wired and wireless communications component, a client-server component and a plurality of input/output (I/O) ports;

Wherein said microcontroller is configured to convert light receivers' frame position values into ball flight data;

said microcontroller further configured to transmit ball flight data to at least one mobile computing device;

said ball flight data comprising a score, an elevation angle, a trajectory angle and a golf shot type characterization;

an application installed on said mobile computing device, wherein the application is configured to interface with an operating system (OS), the microcontroller, a wireless networking component, a program memory component, a random access memory component (RAM), a client-server component, a database component, a graphical user interface (GUI) and a storage component;

said mobile computing device comprising a wireless communications component, a graphical user interface (GUI) component, a random access memory (RAM) component), a program memory component, a storage component, a client-server component, a database component and a storage component;

said mobile computing device is further configured to receive said ball flight data from the microcontroller;

said mobile computing device is further configured to define pre-shot data comprising a golf shot intended, a golf club used, a plurality of setup keys and a plurality of swing keys;

said mobile computing device is further configured to append the ball flight data to the pre-shot data, wherein the pre-shot data and the ball flight data are configured to form a shot information data record;

said mobile computing device is further configured to store said shot information data record in a database, wherein a date, a time and a username are appended to said shot information data record;

said mobile computing device is further configured to allow a user to view, edit, add and delete pre-shot data and to enter a comment;

wherein said mobile computing device is further configured to present to a user his/her current shot information record arranged to show a score, a quadrant, an elevation angle, a trajectory angle, a resultant type golf shot characterization, a golf shot intended, a golf club used and a golf swing analysis comprising the user's swing keys stored in the shot information record which correlate the current user ball flight data with the user's setup keys and swing keys;

said mobile computing device is further configured to allow a user to compose a plurality of basic reports against said database, wherein said application is configured to produce a statistical analysis of a user's stored shot information data, wherein said basic reports queries result in a basic shots report presented to the user;

said mobile computing device is further configured to allow a user to compose a plurality of advanced reports against said database, wherein said application is configured to produce a statistical analysis of a user's stored shot information data, wherein said advanced reports result in an advanced reports presented to the user; and said basic and advanced reports, wherein the user is allowed to compose report criteria or filters, wherein a computer command is generated to access the database to produce the basic or advanced reports requested.

* * * * *